US008121642B2

(12) United States Patent
James et al.

(10) Patent No.: US 8,121,642 B2
(45) Date of Patent: Feb. 21, 2012

(54) WIRELESS USER NETWORK FOR HANDHELD INFORMATION TERMINALS

(75) Inventors: Donald W. James, Kirkland, WA (US); Patrick J. Link, Carnation, WA (US); David J. McCarten, Bothell, WA (US)

(73) Assignee: Nintendo Co., Ltd., Kyoto (JP)

( * ) Notice: Subject to any disclaimer, the term of this patent is extended or adjusted under 35 U.S.C. 154(b) by 715 days.

(21) Appl. No.: 11/507,019

(22) Filed: Aug. 21, 2006

(65) Prior Publication Data
US 2007/0121534 A1 May 31, 2007

Related U.S. Application Data

(60) Provisional application No. 60/709,445, filed on Aug. 19, 2005, provisional application No. 60/810,160, filed on Jun. 2, 2006.

(51) Int. Cl.
H04B 1/38 (2006.01)
(52) U.S. Cl. .................. 455/557; 455/418; 455/419
(58) Field of Classification Search .................. 455/557, 455/418, 419
See application file for complete search history.

(56) References Cited

U.S. PATENT DOCUMENTS

| 7,149,549 | B1 | 12/2006 | Ortiz et al. |
| 7,347,780 | B1 | 3/2008 | Best |
| 7,376,388 | B2 | 5/2008 | Ortiz et al. |
| 7,394,457 | B2 | 7/2008 | Adams et al. |
| 2002/0063799 | A1 | 5/2002 | Ortiz et al. |
| 2003/0112354 | A1 | 6/2003 | Ortiz et al. |
| 2004/0225540 | A1* | 11/2004 | Waytena et al. .................. 705/5 |
| 2004/0266409 | A1* | 12/2004 | Nielsen et al. ............. 455/414.2 |
| 2005/0233733 | A1* | 10/2005 | Roundtree et al. .......... 455/414.1 |
| 2006/0104232 | A1* | 5/2006 | Gidwani ....................... 370/328 |
| 2006/0148522 | A1* | 7/2006 | Chipchase et al. ............ 455/557 |
| 2006/0229099 | A1 | 10/2006 | Chen et al. |
| 2006/0258337 | A1 | 11/2006 | Fujita et al. |
| 2006/0268793 | A1* | 11/2006 | Zanaty .......................... 370/338 |
| 2006/0270386 | A1* | 11/2006 | Yu et al. ........................ 455/406 |
| 2006/0288375 | A1 | 12/2006 | Ortiz et al. |
| 2007/0155406 | A1* | 7/2007 | Dowling et al. ........... 455/456.1 |
| 2007/0216783 | A1 | 9/2007 | Ortiz et al. |
| 2008/0016534 | A1 | 1/2008 | Ortiz et al. |
| 2008/0065768 | A1 | 3/2008 | Ortiz et al. |
| 2008/0151943 | A1* | 6/2008 | Lechleider et al. ........... 370/529 |

OTHER PUBLICATIONS

Boyter, "Front Row takes a new look at the old ball game"; Dallas Forth Worth TechBiz; The News Source for Metroplex Technology Leaders; www.dfwtechbiz.com ; Jul. 16-22, 2001.
International Search Report for PCT/US06/32540 dated Aug. 25, 2008.
Written Opinion for PCT/US06/32540 dated Aug. 25, 2008.

* cited by examiner

Primary Examiner — Barry Taylor
(74) Attorney, Agent, or Firm — Nixon & Vanderhye P.C.

(57) ABSTRACT

An example user network provides information and entertainment for users via handheld information terminals. The "look and feel" and personality of the handheld information terminals can be location-specific so that the most relevant information and entertainment can be provided to users in a useful and appealing manner.

34 Claims, 23 Drawing Sheets

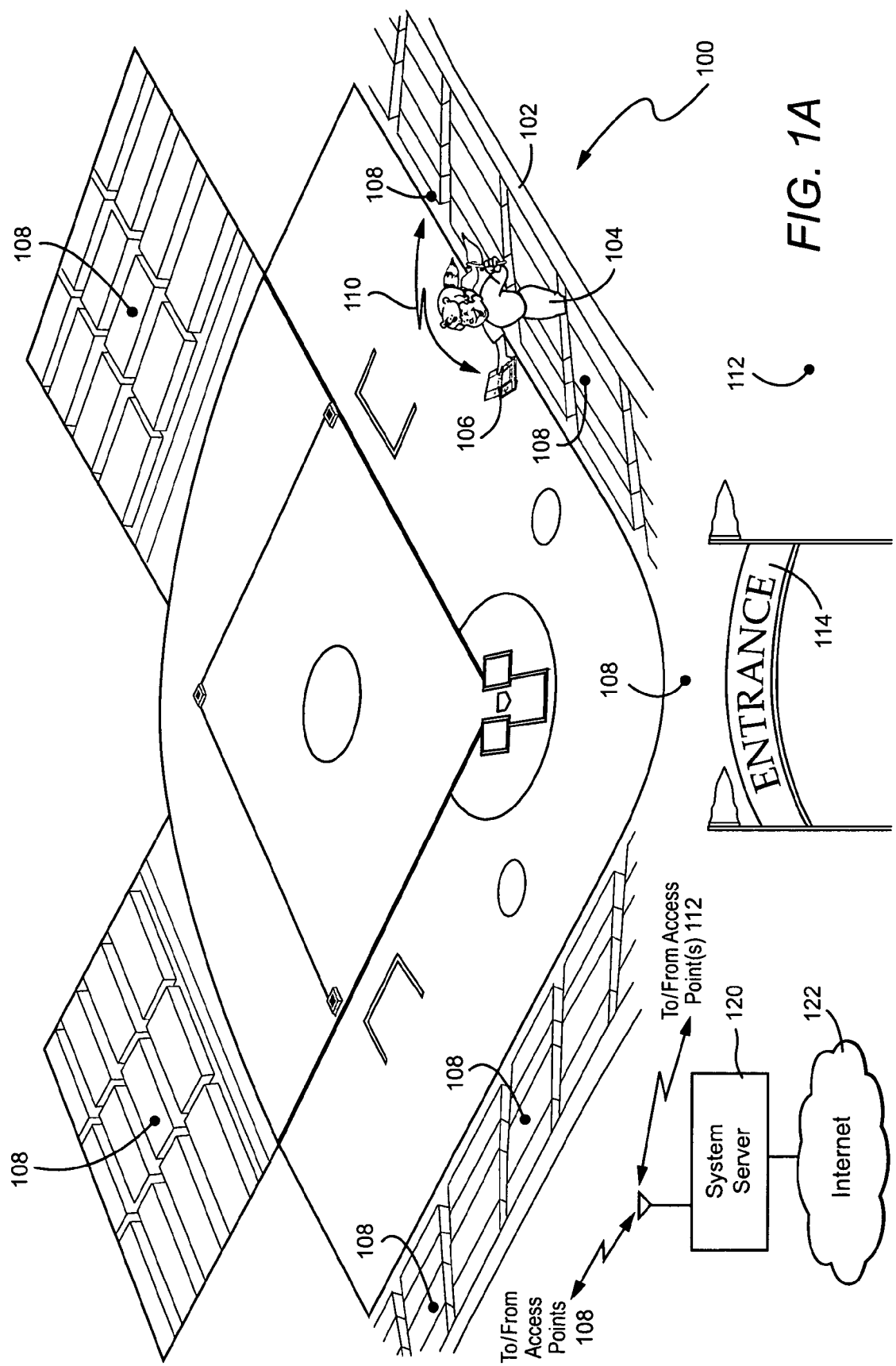

Example Protocol Stack

| Access Point | Game Machine |
|---|---|
| Network Packet | State Machine |
| UDP | UDP |
| IP | IP |
| WiFi Driver | WiFi Driver |

FIG. 12B

Example Protocol Stack

| Access Point | Game Machine |
|---|---|
| Network Packet | Network Packet |
| UDP | UDP |
| IP | IP |
| WiFi Driver | WiFi Driver |

FIG. 12A

Network Packet Format

- 16 bit header
  - 2 bit Camera Number
  - 2 bit Data Type (01 = Camera data)
  - 12 bit Sequence number
- data size determined by video encoding

Example UDP Data Format

| 16 bit source port number | 16 bit destination port number |
|---|---|
| 16 bit UDP length | 16 bit UDP checksum |
| Data (if any) - variable length ||

*FIG. 14*

Example IP Header

| 4 bit version | 4 bit header length | 8 bit type of service (TOS) | 16 bit total length (in bytes) ||
|---|---|---|---|---|
| 16 bit Identification ||| 3 bit flags | 13 bit fragment offset |
| 8 bit time to live (TTL) || 8 bit protocol | 16 bit header checksum ||
| 32 bit source IP Address |||||
| 32 bit destination IP Address |||||
| Options (if any) - variable length |||||
| Data - variable length |||||

*FIG. 15*

WIRELESS USER NETWORK FOR HANDHELD INFORMATION TERMINALS

CROSS REFERENCE TO RELATED APPLICATIONS

This application claims the benefit of provisional Application No. 60/709,445, filed Aug. 19, 2005 and provisional Application No. 60/810,160, filed Jun. 2, 2006. The contents of the each of these application are incorporated herein in their entirety.

BACKGROUND AND SUMMARY

This application describes a wireless user network for use with handheld information terminals, particularly a network that can be used at stadiums and arenas and at theme parks, amusement parks, museums, shopping malls, fairs, zoos and the like.

The wireless user network for portable handheld information terminals described herein can be implemented by way of example without limitation at stadiums or arenas for sporting events, concerts, etc., as well as at various sites such as theme parks, amusement parks, museums, zoos, shopping malls, fairs, etc. having multiple "attractions". In the case of a theme park, the multiple attractions may include rides, exhibits, performances, restaurants, snack bars, stores, souvenir shops and the like. In the case of a zoo, the multiple attractions may include animal exhibits, petting areas, restaurants, snack bars, stores, souvenir shops and the like. In the case of shopping malls, the attractions may include stores, restaurants, theaters, and the like.

The user network can be used to provide information and entertainment for users via the handheld information terminals. The "look and feel" and personality of the handheld information terminals can be location-specific so that the most relevant information and entertainment can be provided to the users in a useful and appealing manner.

For example, when the user network is implemented at a stadium for a baseball game, a user's handheld information terminal functions as a "baseball game assistant" by which the user can access content (e.g., information and entertainment) relevant to that stadium and that game. This content can include statistics of the players on the respective teams, video feeds of the game from different camera locations, food and beverage services, and the like. Using the "baseball game assistant", the user can order food from his/her seat and watch selected video feeds or replays. The look and feel of the interface of the "baseball game assistant" can be specifically tailored, for example, to home team's stadium. Thus, for example, in the case of the New York Yankees, this might include the use of background images including pinstripes, an interlocking "N" and "Y", the Old Yankee Stadium facade, etc. The functionality of the "baseball game assistant" may be provided by a program wirelessly downloaded to the user's handheld information terminal when the user arrives at the stadium or at his/her seat.

By way of further example, when the user network is implemented at a theme park, a user's handheld information terminal functions as a "theme park assistant" by which the user can access content relevant to that particular theme park and the attractions at the park. Upon arriving at the park, a core application can be wirelessly downloaded to the user's handheld information terminal so that the user can access general content relevant to the park such as a list of rides, exhibits, attractions, stores, restaurants, facilities, a listing of the wait times associated with the rides, exhibits, etc., and other theme park information. Using this core application for the "theme park assistant", the user may, for example, reserve a time for a particular ride or attraction, to avoid long lines. The user may also order merchandise from stores within the theme park and arrange to pick up the purchases upon leaving the park or to have the purchases delivered to a hotel room or shipped to their home. The user may make reservations at park restaurants.

As the user moves from attraction to attraction, incremental content may be added to the core application by additional wireless downloads. This incremental content may be "pushed" to handheld information terminal so that as the user approaches a particular attraction, the terminal automatically changes or morphs into a user assistant for that particular attraction. Thus, for example, as a user approaches a rollercoaster ride, the handheld information terminal suddenly morphs into a "rollercoaster user assistant" with colors, art, personality, etc. specific to the rollercoaster. Using the "rollercoaster assistant", the user can access information relevant to the rollercoaster such as any restrictions on who can ride the rollercoaster, video feed(s) of different parts of the rollercoaster ride, rollercoaster-related mini-games, and the like. One particular advantageous aspect of a "ride assistant" such as the "rollercoaster assistant" is to engage the user during any wait time for the ride. This may be through mini-games, videos, contests, etc. that are accessible using the "ride assistant".

Theme park attractions are frequently based on, or are tie-ins for, movies, television programs, characters, and the like. In this case, the content for engaging the user during wait times can include movies or television program clips; behind-the-scenes video of the making of the movie or television program; history or background of the movie, television program or character associated with the attraction; video games or mini-games based on the movie, television program, or character; merchandise sales; and the like.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 1A and 1B show example systems in which the network described herein may be implemented;

FIGS. 12A and 12B show example protocol stacks;

FIG. 14 shows an example UDP data format;
FIG. 15 shows an example IP header.

DETAILED DESCRIPTION OF EXAMPLE EMBODIMENTS

Figure 1B:
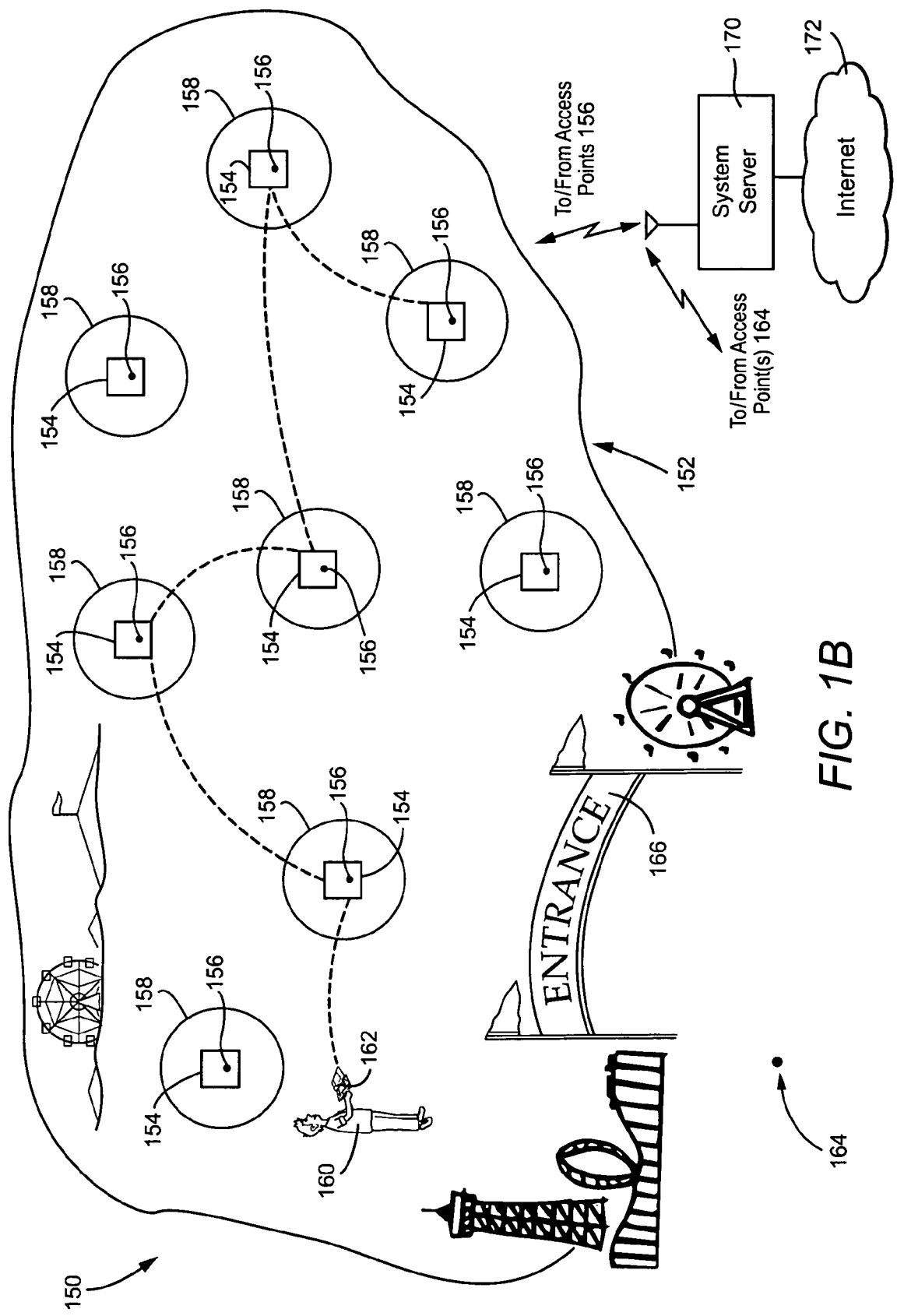

As described in greater detail below, an example wireless user network may include one or more network servers (e.g., media servers) with internet access, one or more wireless access points (WAPs), and one or more wireless enabled portable handheld information terminals (clients) such as (but not limited to) handheld game machines such as the Nintendo DS product.

The network servers may be located in various public or private locations and, in an example implementation, these servers are dedicated to the wireless user network. Depending on the implementation, the servers, among other things, provide relevant interactive applications to the information terminals, "push" information to the information terminals, and encode and broadcast local specific video feeds. The interactive applications may be located on the user network server prior to download to the handheld information terminal or come from a remote site via an internet connection to the user network server. The download of applications and video feeds from the network server's wireless access point to the client handheld information terminal is via a wireless interface that may conform to conventional (e.g., 802.11) and/or proprietary protocols.

The list of possible environments for the wireless user network is virtually without limits. Because the client handheld information terminal can get its look and feel (interface), personality and functionality from its environment, it can be unique for every possible genre of the wireless user network. Whether it is baseball (e.g., MLB), football (e.g., NFL), basketball (e.g., NBA), hockey (e.g., NHL), amusement parks, theme parks, museums, fairs, zoos, fast-food restaurants, specialty shops, or any other public locations or events, the client handheld information terminal via the local network server will take on characteristics in a "chameleon-like" manner and blend into the current environment with a custom interactive interface that may, for example, be downloaded. As described in greater detail below, the interface may be developed with a user-friendly scripting language (e.g., CNScript®) so that even a non-programmer can develop an application specific interactive interface.

Other environments for the network described herein include but are not limited to college sports (football, basketball, hockey, etc.); education (e.g., a "math 101 user assistant"); traveler or tourist information (e.g., a "Baltimore user assistant"; a "Smithsonian user assistant"; a "Seattle-Tacoma International Airport user assistant"; etc.); a personal cash register (e.g., a "grocery store user assistant" that allows a user to scan merchandise, and pay, via the user assistant, using a pre-established account or credit card); surveys (e.g., a "survey user assistant" that provides a means of filling out surveys quickly and conveniently, providing retailers, companies, government agencies, schools, etc. a means of gathering consumer information); inventory scanning (e.g., an "inventory user assistant" provides a convenient means of counting inventory within a store, warehouse or company); a "museum user assistant"; a language translator; and a "college orientation assistant".

An interactive interface and related applications may be provided in various ways to the handheld information terminal. By way of example without limitation, the interface and applications may be downloaded when the handheld information terminal connects to a wireless access point. In an alternative implementation, various interfaces and/or applications may be stored in memory (removable or non-removable) of the handheld information terminal. The handheld information terminal may then receive interface designating data from a wireless access point designating particular interface(s) and/or application(s) which are then executed. For example, a visitor to a zoo may be provided with a cartridge containing interface(s) and application(s) for various exhibits. When the visitor's handheld information terminal connects to a wireless access point for a particular exhibit, it receives data designating interface(s) and application(s) for that exhibit, which are then executed by the information terminal.

The client handheld information terminal can decode and display video feeds as well as download a local specific persona along with interactive applications that allow location unique interactivity in the form of games, puzzles, prizes and such. When the handheld information terminal is in range of one of the user network wireless access points, it will be able to download some or all of the look and feel of its current surroundings and the necessary interface in a way that seamlessly blends to its new environment.

FIG. 1A shows an overall view of an example system 100 which may be used to implement the wireless user network described herein at a baseball stadium 102. A fan 104 carrying a portable handheld information terminal 106 is seated within stadium 102. The information terminal 106 connects to the wireless consumer network via a wireless link 110 to one of the access points 108 located at various positions throughout the stadium. It will be readily apparent that the number and position of the wireless access points will depend on a variety of factors such as the desired amount of network coverage (i.e., will network access be provided throughout the stadium or be limited to particular sections thereof). The wireless access points 108 are connected in a wired or wireless manner to a system server 120 which is preferably connected to the internet 122.

Once connected to the system server 120, user 104 can use handheld information terminal 106 to access a variety of features for enhancing the experience of attending the baseball game. As will be explained in greater detail below, these features include, but are not limited to, ordering food; viewing player information such as player statistics; viewing one or more video feeds for the game at the stadium 102 or for other games; viewing out-of-town scores; and the like.

System 100 also includes a wireless access point 112 generally positioned so as to provide wireless coverage in the vicinity of an entrance 114 of the stadium. Although only one access point 112 and one entrance are shown in FIG. 1A, it will be appreciated that access points may be provided for other entrances and/or that access point 112 may provide wireless coverage for multiple entrances. Wireless access point 112 is connected by wire or wirelessly with system server 120. In this example system 100, wireless access point 112 enables user 104 to initialize his/her information terminal 106 for use in the network. This initialization may involve, for example, downloading an application, program, routine, kernel, or script, etc. that provides an interface for accessing via access points 108 the features provided by system server 120. In some implementations, there may be a fee associated with this initialization.

In particular implementations in which handheld information terminal 106 is adapted to communicate in different wireless modes (e.g., using different protocols or different frequency bands, etc.), communication with wireless access point 112 may use a first wireless communication mode (e.g., a secure, proprietary ad-hoc mode) and communication with wireless access points 108 may use a second wireless communication mode (e.g., a conventional WiFi infrastructure mode).

Although FIG. 1A shows wireless access point 112 connected to system server 120, wireless access point may additionally or alternatively be connected to a separate server for performing the initialization aspects of the system.

FIG. 1B shows an overall view of an example implementation of a system 150 which may be used to implement the network described herein at a site 152 having multiple attractions 154. In FIG. 1B, site 152 is an amusement park, although the systems and methods described herein are in no way limited in this respect. Each attraction 154 has an associated wireless access point 156 which provides an associated coverage area 158. The wireless access points 156 are connected in a wired or wireless manner to a system server 170 which is preferably connected to the internet 172. User 160 can use handheld information terminal 162 to access a variety of features supported by system server 170 for enhancing the experience of the attractions.

More specifically, when user 160 carries information terminal 162 into one of coverage areas 158, the information terminal connects to the corresponding wireless access point and acquires, for example, from system server 170, a look and feel, personality and functionality based on the access point to which it connects. For example, if the wireless access point to which information terminal 162 connects is associated with an amusement park ride, information terminal 162 acquires a look and feel, personality and functionality associated (even uniquely associated) with that ride. It will be appreciated that as the user 160 travels throughout the site and enters and leaves different coverage areas 158, information terminal 162 connects to and disconnects from different ones of the access points 156. Consequently, information terminal 162 exhibits different looks and feels, personalities and functionalities as it disconnects from one wireless access point associated with a first attraction and connects to another wireless access point associated with a second, different attraction.

In this example system 150, when the information terminal 162 connects to a particular one of the access points 156, the information terminal is thereafter able to, for example, receive information relevant to that attraction. As will be explained in greater detail below, this information can be information describing the attraction, any wait time associated with the attraction, entertainment information for viewing by the user while waiting on line for the attraction, and the like.

FIG. 1B shows the wireless access points positioned at the center of the corresponding attractions and the coverage areas thereof as being circular. Such an arrangement is shown for ease of illustration and explanation only and the positions of the wireless access points and the shapes of the coverage areas are not limited in this regard.

System 150 also includes a wireless access point 164 generally positioned so as to provide wireless coverage in the vicinity of the entrance 166 of the stadium. Wireless access point 164 is connected by wire or wirelessly with system server 170. In this example system 150, wireless access point 164 enables user 160 to initialize his/her information terminal 162 for use in the network. This initialization may involve, for example, wirelessly downloading a core application to the user's handheld information terminal so that the user can access general content relevant to the site. A fee may be associated with the downloading of this core application.

As the user moves from one attraction 154 to another at site 152, incremental content may be added to the core application by additional wireless downloads. This incremental content may be "pushed" to handheld information terminal so that as the user approaches a particular attraction 154, the terminal automatically changes or morphs into a user assistant for that particular attraction. Thus, for example, as a user approaches a rollercoaster ride at an amusement park, the handheld information terminal suddenly morphs into a "rollercoaster user assistant" with colors, art, personality, etc. specific to the rollercoaster. Using the "rollercoaster assistant", the user can access information relevant to the rollercoaster such as any restrictions on who can ride the rollercoaster, video feed(s) of different parts of the rollercoaster ride, rollercoaster-related mini-games, and the like. One particular advantageous aspect of a "ride assistant" such as the "rollercoaster assistant" is to engage the user during any wait time for the ride. This may be through mini-games, videos, contests, etc. that are accessible using the "ride assistant".

Theme park attractions are frequently based on, or are tie-ins for, movies, television programs, characters, and the like. In this case, the content for engaging the user during wait times can include movies or television program clips; behind-the-scenes video of the making of the movie or television program; history or background of the movie, television program or character associated with the attraction; video games or mini-games based on the movie, television program, or character; merchandise sales; and the like.

Generally, such incremental content is supplied without payment of an additional fee, but of course a fee may be charged for some or all of the incremental content. For example, there may be basic incremental content provided without any fee beyond the fee associated with downloading the core application. "Premium" incremental content such as video and games may have an additional fee associated therewith. This additional fee may be assessed at the time of the downloading of the core application (in which case the user may be provided with access to premium content for all attractions) or it may be assessed on an attraction-by-attraction basis.

By way of further example, system 150 may be implemented at a shopping mall site. A user enters the shopping mall with a handheld information terminal 162 and loads a core application program (for example, by download from access point 164). The handheld information terminal 162 then morphs into a "mall user assistant." As such, a display screen of the handheld information terminal may show one or more of a map of the mall; a list of stores, restaurants, theaters, facilities, exits; electronic coupons; special offers; etc. If the user enters a store in the mall (e.g., "Acme Hardware"), the handheld information terminal suddenly morphs into the "Acme Hardware user assistant" via a wireless download of incremental content from a wireless access point associated with the Acme Hardware store. In this mode, the display screen of the handheld information terminal may show Acme Hardware colors and personality. Again special offers, e-coupons and information specific to this Acme hardware store are now accessible to the user. The handheld information terminal continues to morph as the user continues his/her mall shopping experience.

By way of still further example, system 150 may be implemented at a theme park site. A user enters the theme park with a handheld information terminal 162 and loads a core application program (for example, by download from access point 164). The handheld information terminal 162 then morphs into a "FunforAll theme park assistant." As such the user is offered a list of rides, exhibits, attractions, stores, restaurants, facilities and other FunforAll theme park information. Using the theme park assistant, the user may, for example, make an appointment for a particular ride or attraction, to avoid long lines. The user may also order merchandise from stores within the theme park and arrange to have purchases picked up upon leaving the park, delivered to a hotel room, or shipped to their home. This permits souvenirs and the like to be purchased, but relieves the user from having to carry the purchases around through the day. The user may make reservations at park restaurants. As the consumer approaches an exhibit, the handheld information terminal suddenly morphs into an "exhibit user assistant" with colors, art and personality specific to the exhibit.

Information terminals 106 and 162 may be realized in the form of a personal digital assistant (PDA), a mobile telephone, a handheld game machine or any other type of mobile communication device. The core application and incremental content is preferably adapted for, for example, for the operating system and display capabilities of the particular type of information terminal. Thus, a user may download a core application adapted for a mobile telephone and even for a specific model of mobile telephone. As the user moves around the site, for example, incremental content is supplied which is adapted for that user's particular type of handheld information terminal. This can be accomplished in various ways. For example, when the user downloads the core application, a user identifier may be assigned which includes an indication of terminal type. As the user connects to different access points, this user identifier is used by the system server to download incremental content suitable for the user's handheld terminal type.

Figure 2:
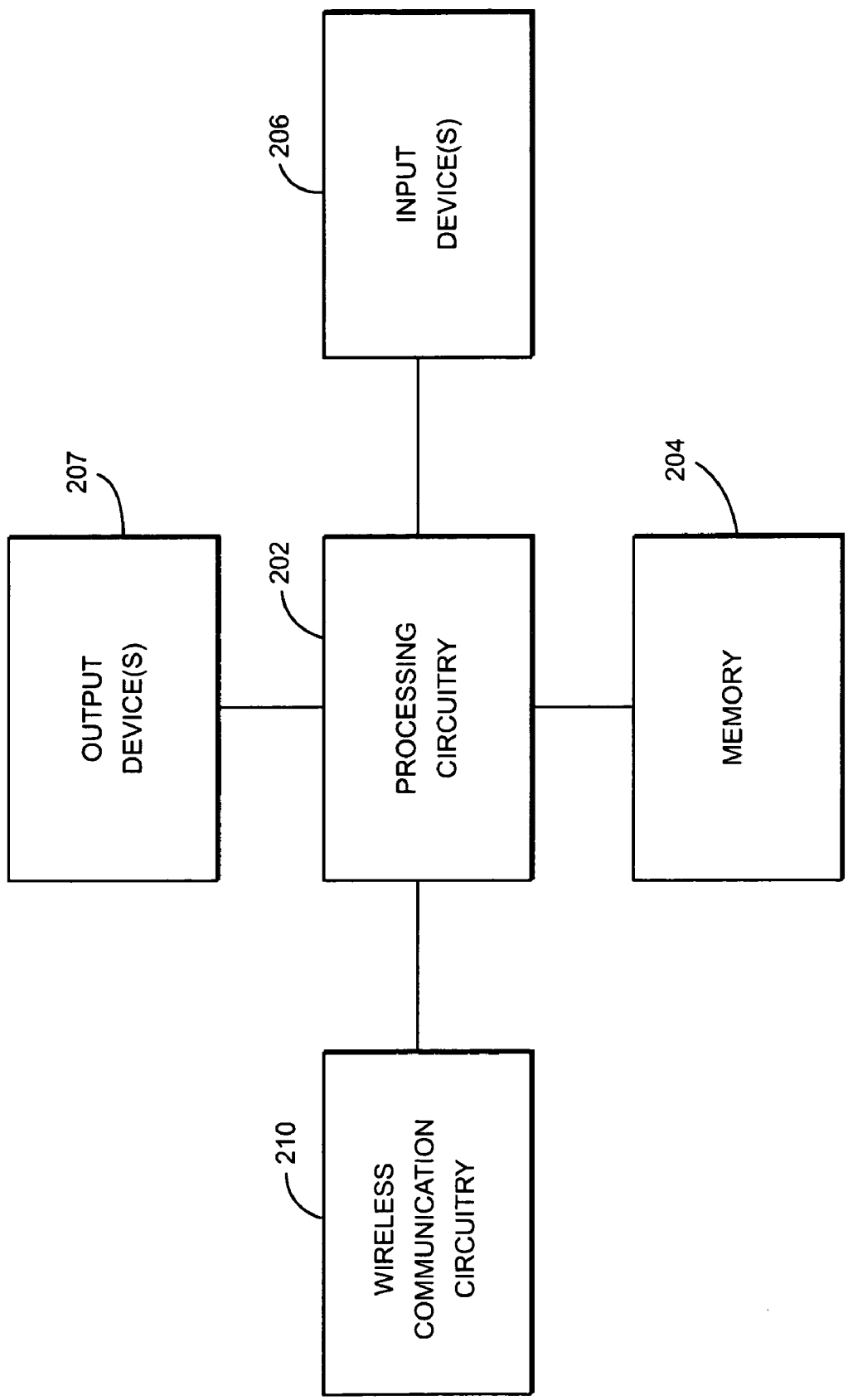
FIG. 2 is a generalized block diagram of an information terminal 106, 162 shown in FIGS. 1A and 1B.

An example information terminal 105, 162 is generally arranged along the lines shown in FIG. 2. Example information terminal 106, 162 includes processing circuitry 202 which controls the overall operation of the terminal. A memory 204 is accessible to the processing circuitry and stores an operating program and data used by the processing circuitry to effect the aforementioned control. Memory 204 may include read/write memory for storing data during terminal operation and read-only memory for storing the operating program. Memory 204 may include a combination of on-board and removable memory. The removable memory may be in the form of magnetic disks, memory cards, optical disks and the like. Input device(s) 206 such as a keypad, a touch-sensitive screen, switches, buttons and the like provide inputs to the processing circuitry 202. Output device(s) 207 such as displays and speakers provide outputs to a user. Wireless communication circuitry 210 enables wireless communication with wireless access points in accordance any conventional or proprietary protocol. As noted above, communication with some wireless access points may use a first protocol and communication with other wireless access points may use a second, different protocol.

Referring to FIGS. 3-9, information terminal 106, 162 may be advantageously implemented as a game system such as the Nintendo DS game system. One particular advantage of using such game system as an information terminal in the network described herein is that there is a large installed base of users each of whom has a device with the same hardware characteristics. Because the network can therefore be designed for a single hardware platform, overall design is simplified.

FIGS. 3-9 show a console 300 that includes a main body 312 and a cover body 314 hingedly connected to each other along an upper edge of the main body 312 and a lower edge of the cover body 314 (references herein to terms such as "upper" and "lower" and "forward" and "rearward" are for ease of understanding and are made relative to an orientation of the game system where the cover body 314 is in an open position and the game system is being held by a user in a normal operating position). Hinge elements 316, 318 and 320 on the main body 312 mesh with hinge elements 322 and 324 on the cover body, with a hinge pin (not shown) extending through the aligned hinge elements in conventional fashion. Note that because hinge elements 316, 318 and 320 extend from the upper (or inner) face 326 of the main body 312, the cover body 314 overlies the upper face 326 when the cover body 314 is closed over the main body. When the cover body 314 is in its fully open position, it is substantially parallel to the main body 312 but lies in a substantially parallel, offset plane. The main body 312 also has a lower (or outer) face 328 (FIG. 4) and a peripheral edge 330.

A first display screen 332 is recessed within the upper face 326 of the main body 312 with dimensions of approximately 2½ inches in length and 1⅞ inches in width, yielding a diagonal screen dimension of 3 inches. The screen in the exemplary embodiment is a backlit (e.g., 40 candelas), color liquid crystal display (LCD) with a display resolution of 256×192 dots (aspect ratio 4:3). This screen is touch sensitive and may be activated by a stylus, described further herein. A power button 334 is located in the upper left corner of face 326 and is used to turn the game on and off. A cross-shaped directional control button 336 is located adjacent and below the power button 334, and is used for game play control.

More specifically, display screen 332 includes a resistive-membrane touch panel that allows coordinates to be obtained in dot units. The touch panel can be operated with a finger or a stylus.

In the upper right corner of the main body 312, there are side-by-side "start" and "select" buttons 338, 340, respectively, with X/Y/A/B buttons 342 located adjacent and below the "start" and "select" buttons. Buttons 338, 340 and 342 are also used for game play control. A microphone 344 (which may be an omni-directional condenser microphone) is located below the left edge of screen 332 for use with specially designed games having a microphone feature. A battery recharge indicator LED 346 and a power indicator LED 348 are also located on the upper face 326, adjacent the lower edge thereof, below the right edge of screen 332.

Figure 5:
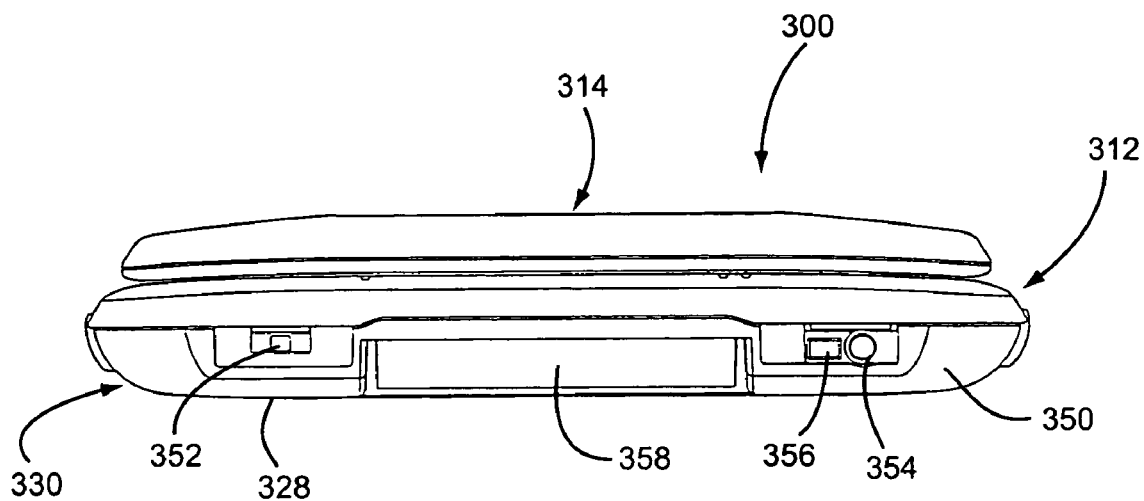
FIG. 5 is a front elevation of the device shown in FIG. 3, but with the game system shown in a closed position.

With reference now especially to FIG. 5, a lower or forward portion 350 of the peripheral edge 330 (closest to the user) is provided with a volume control slide 352 and headphone and microphone connectors 354, 356 on either side of a first game slot 358. Slot 358 is especially designed for larger game cartridges or cards originally designed for use with the assignee's Game Boy Advance game system.

Figure 4:
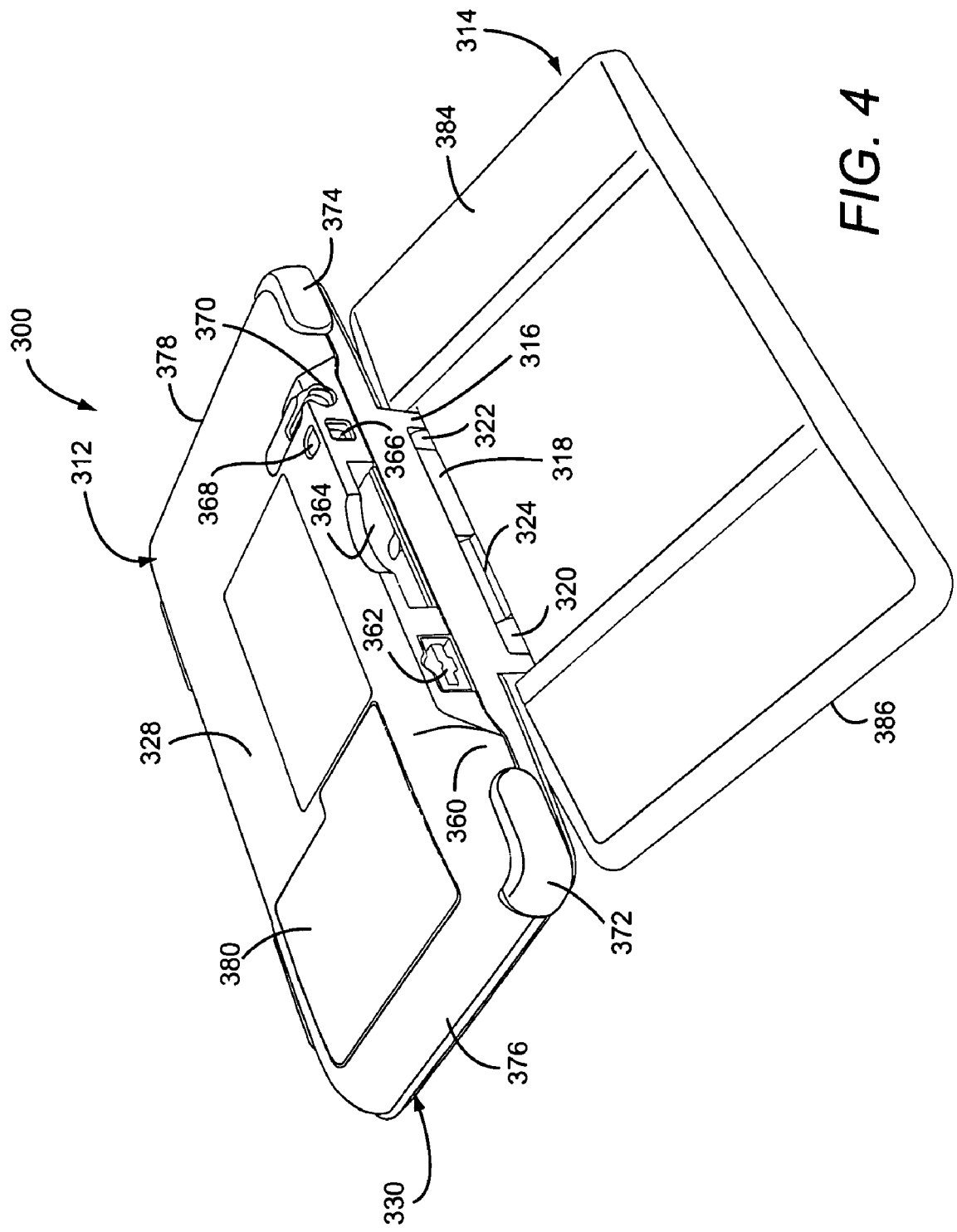
FIG. 4 is a inverted perspective view of the game system shown in FIG. 3.

As best seen in FIG. 4, an upper or rearward portion 360 of the peripheral edge 330 is provided with an external extension connector 362 that permits connection to an AC adapter for recharging the internal battery (not shown), or for operating the game using household power. A second game slot 364 in edge portion 360 is designed for receiving memory or game cards especially designed for this game device. The second game slot 364 is smaller than the first game slot 358, reflecting the different sizes of the game cards. Openings 366, 368 form an elbow-shaped through slot adapted for securing a wrist strap (not shown), thereby enabling the user to secure the game device to the body and thus minimize the potential for losing or misplacing the game. A stylus port or holder, in the form of a blind bore 370 is located adjacent the wrist-strap mount for holding a stylus 371 (FIG. 7) before or after use.

Figure 7:
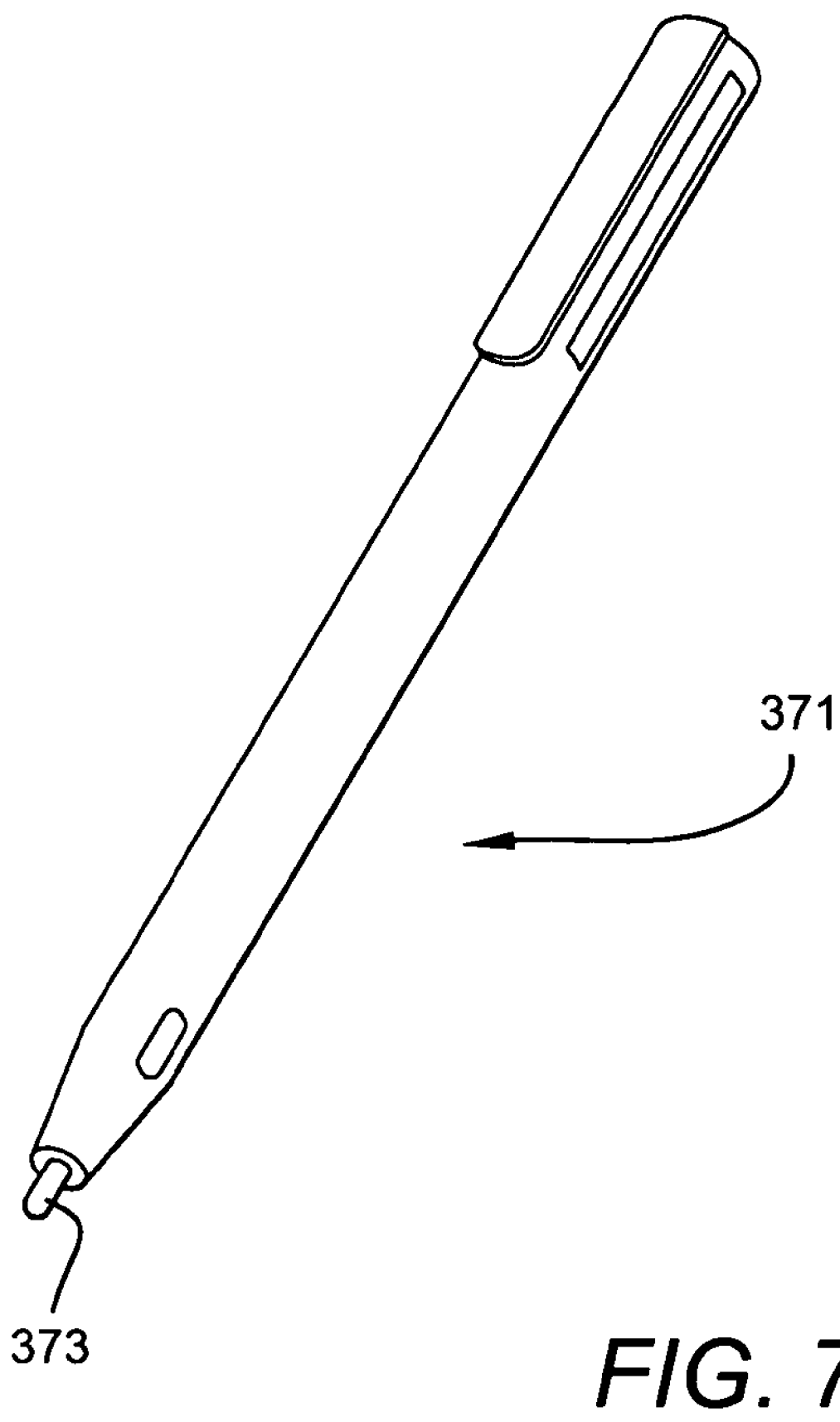
FIG. 7 is a perspective view of a stylus for use with the game system shown in FIGS. 3-6.

With reference to FIG. 7, the stylus 371 is a plastic pencil-shaped device with a rounded tip 373 and is used to activate the touch screen 332.

A pair of left, right control buttons (or shoulder buttons) 372, 374 are located on the peripheral edge 330, at the corners where the upper portion 360 of the peripheral edge 330 meets the side portions 376, 378 of the peripheral edge. The location of these buttons and the location of previously described buttons 334, 336 and 342 facilitate manipulation game control by the user's thumbs and index fingers when the game is held with two hands in a natural and intuitive manner.

The lower (or outer) face 328 of the main body is provided with a battery cover 380 (FIG. 4) for accessing a rechargeable battery pack located within the main body.

The cover body 314 also has an upper (or inner) face 382 (FIG. 3) and a lower (or outer) face 384 (FIG. 4) connected by a peripheral edge 386. The upper face 382 incorporates a second display screen 388 of substantially the same dimensions as screen 332. Screen 388 is also a backlit color LCD. The cover body 314 also incorporates a pair of stereo speakers, with speaker grills 390, 392 located on opposite sides of the screen 388. Dimples or pads 394, 396 may be located above and laterally of screen 388. The dimples may be made of a compressible polymer or other suitable material and serve to dampen engagement of the inner surface 382 of the cover body 314 with the inner surface 326 of the main body 312 when the cover body is closed over the main body.

As already noted, the game card slot 358 is sized and adapted to receive a conventional game card designed for the by now well known Nintendo Gameboy Advance System. Accordingly, the game card per se for slot 358 does not form any part of this invention and need not be described further.

Figure 8:
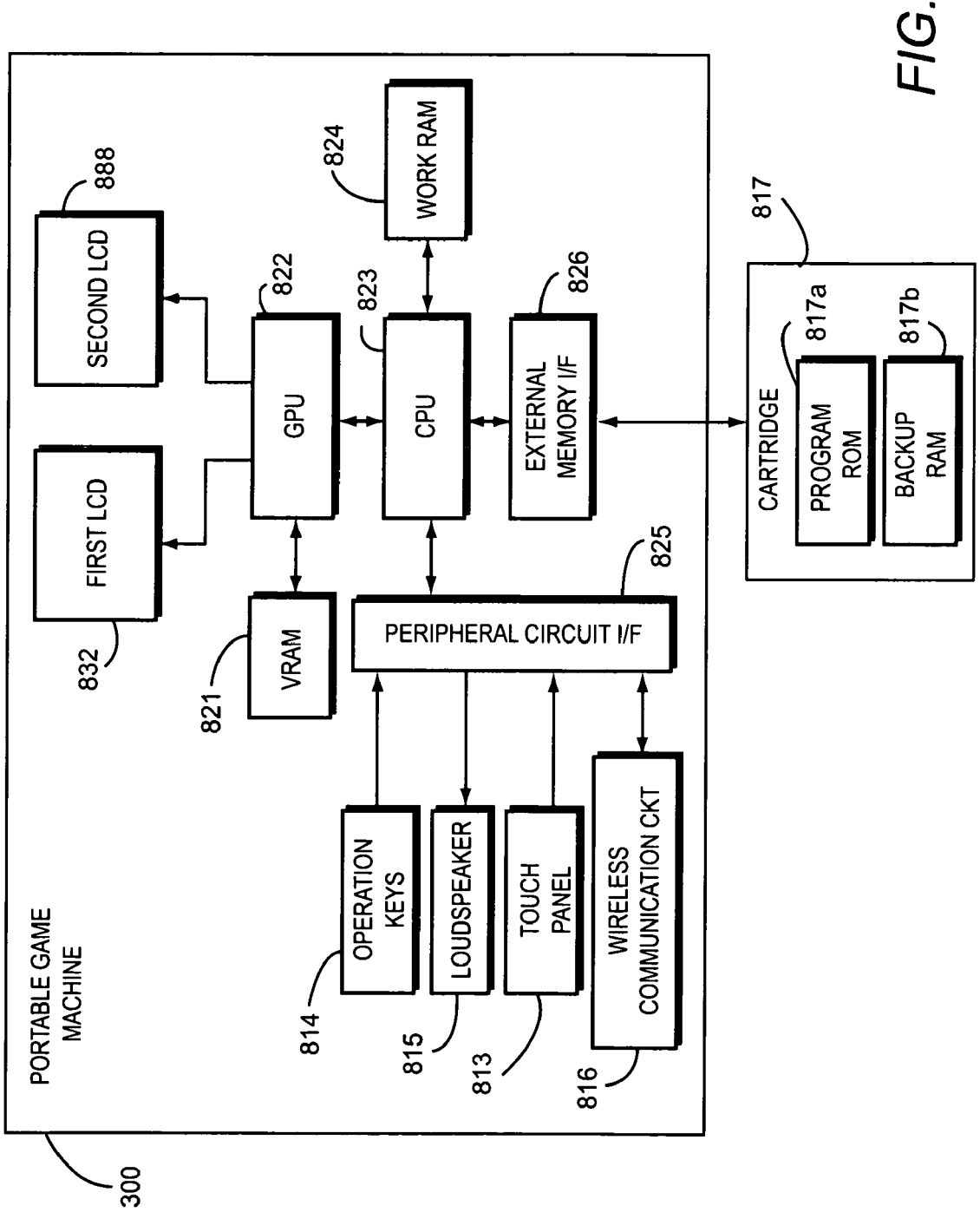
FIG. 8 is an illustration showing an example internal configuration of the portable game system shown in FIGS. 3-6.

FIG. 8 is an illustration showing an example internal configuration of the portable game system 300. As shown in FIG. 8, the portable game system 300 includes a CPU (central processing unit) 823, which is an example of a computer for executing the game program, and other components. The CPU 823 is coupled to a work RAM (working storage unit) 824, a GPU (graphic processing unit) 822, a peripheral circuit I/F (interface) 825 that are electrically connected to one another, and an external memory interface 826. The work RAM 824 is a memory for temporarily storing, for example, the game program to be executed by the CPU 823 and calculation results of the CPU 823. The GPU 822 uses, in response to an instruction from the CPU 823, a VRAM 821 to generate a game image for display output to first LCD 832 and second LCD 888, and causes the generated game image to be displayed on the first display screen 332 of the first LCD 832 and on the second display screen 388 of the second LCD 888. The peripheral circuit I/F 825 is a circuit for transmitting and receiving data between external input/output units, such as the touch panel 313, the operation keys 314, the loudspeaker 315, and wireless communication circuit 816, and the CPU 823. The touch panel 313 (including a device driver for the touch panel) outputs coordinate data corresponding to a position input (specified) with the stylus 371. The wireless communication circuit 816 may be configured for wireless communication in accordance with any of various known wireless protocols such as Bluetooth; any type of 802.11 (Wi-Fi) protocol; HiperLAN/1 protocol; HiperLAN/2 protocol; HomeRF protocol; etc. Although shown as a single block, wireless communication circuit 816 is intended to encompass arrangements in which two or more different protocols are usable or two or more different circuits (e.g., one for short-range communications such as WiFi and another for long-range communications using, for example, wireless telephone protocols) are provided. Of course, the example portable game system is not limited to wireless communication and may alternatively or additionally include circuitry that provides a wired communication link, e.g., to an internet access point.

To access the internet using the portable game machine, wireless communication circuit 816 may, for example, wirelessly connect to an internet access point. Such an access point may be in a public location (e.g., stores, malls, libraries, etc.) or may be in a user's home (e.g., a cable modem).

The CPU 823 is electrically connected to the external memory I/F 826, in which the cartridge 817 is inserted via slot 364. The cartridge 817 is a storage medium for storing the game program and, specifically, includes a program ROM 817a for storing the game program and a backup RAM 817b for rewritably storing backup data. The game program stored in the program ROM 817a of the cartridge 817 is loaded to the work RAM 824 and is then executed by the CPU 823. In the present embodiment, an exemplary case is described in which the game program is supplied from an external storage medium to the portable game system 300. However, the game program may be stored in a non-volatile memory incorporated in advance in the portable game system 300, or may be supplied to the portable game system 300 via a wired or wireless communication circuit.

Figure 9:
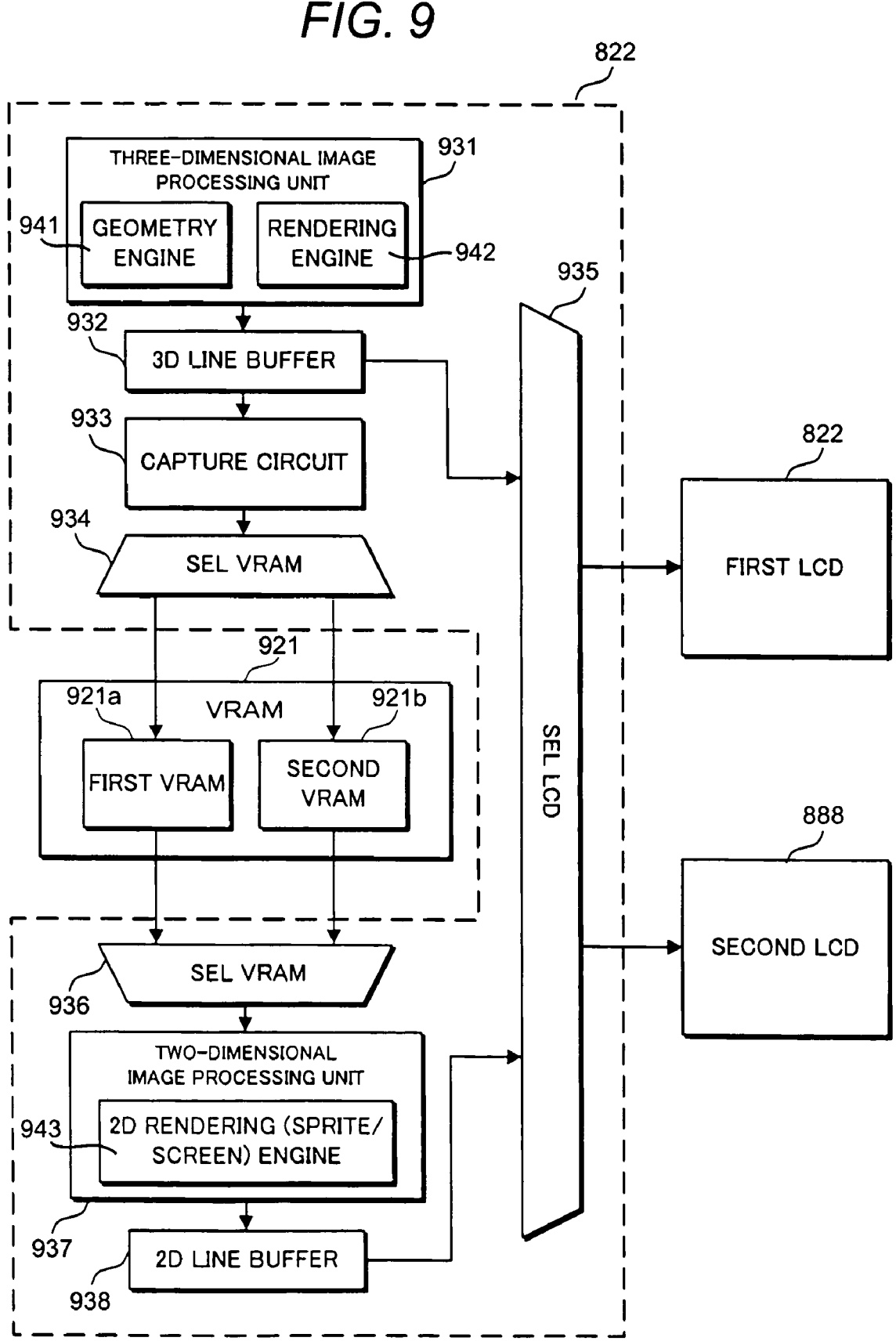
FIG. 9 is an illustration showing an example internal configuration of a GPU 222.

FIG. 9 is a block diagram of an example configuration for the GPU 822. The GPU 822 includes two image processing units, that is, a three-dimensional image processing unit 931 and a two-dimensional image processing unit 937. The three-dimensional image processing unit 931 includes a geometry engine 941 for calculating each vertex of a three-dimensional model based on three-dimensional model data and a rendering engine 942 for generating a game image from the three-dimensional model disposed on a virtual three-dimensional game space. The two-dimensional image processing unit 937 includes a 2D rendering engine 943 for generating a game image based on two-dimensional image data representing characters and two-dimensional image data representing backgrounds. More specifically, the two-dimensional image processing unit 937 disposes a two-dimensional image representing a character on a virtual screen called a "sprite" and a two-dimensional image representing a background on a virtual screen called a "screen", and then synthesizes these virtual screens to generate a game image to be eventually displayed.

The three-dimensional image processing unit 931 is connected to the 3D line buffer 932. The 3D line buffer 932 is a buffer memory for temporarily retaining image data for one scanning line of the first LCD 332 (or the second LCD 388). The image data generated by the three-dimensional image processing unit 931 is stored in this 3D line buffer 932 sequentially by one line.

The 3D line buffer 932 is connected to a capture circuit 933 and an LCD selector (SEL LCD) 935. The capture circuit 933 sequentially reads image data for one line stored in the 3D line buffer 932 and then sequentially stores the read image data in the VRAM 921, which will be described further below, thereby capturing the game image generated by the three-dimensional image processing unit 931.

The capture circuit 933 is connected to a VRAM selector (SEL VRAM) 934. The VRAM 921 is provided with two VRAMs, that is, a first VRAM 921a and a second VRAM 921b. Instead of these two first and second VRAMs 921a and 921b, a single VRAM may be used with its two different storage areas being used as the first VRAM 921a and the second VRAM 921b. The VRAM selector 934 switches an output destination of the capture circuit 933 between the first VRAM 921a and the second VRAM 921b.

The first VRAM 921a and the second VRAM 921b are connected to a VRAM selector (SEL VRAM) 936. The VRAM selector 936 switches a source of data to the two-dimensional image processing unit 937 between the first VRAM 921a and the second VRAM 921b.

The two-dimensional image processing unit 937 is connected to a 2D line buffer 938. As with the 3D line buffer 932, the 2D line buffer 938 is a buffer memory for temporarily retaining image data for one scanning line of the second LCD 388. The image data generated by the two-dimensional image processing unit 937 is stored in this 2D line buffer 938 sequentially by one line.

The 2D line buffer 938 is connected to an LCD selector 935. The LCD selector 935 switches an output destination of the 3D line buffer 932 between the first LCD 332 and the second LCD 388, and an output destination of the 2D line buffer 938 between the first LCD 332 and the second LCD 388. In the present embodiment, the LCD selector 935 performs control such that, when the output of the 3D line buffer 932 is supplied to the first LCD 332, the output of the 2D line buffer 938 is supplied to the second LCD 388, and when the output of the 3D line buffer 932 is supplied to the second LCD 388, the output of the 2D line buffer 938 is supplied to the first LCD 332.

Additional information regarding portable game system 300 may be found in application Ser. Nos. 11/111,985 filed Apr. 22, 2005 and 10/921,957, filed Aug. 20, 2004, the contents of which are incorporated herein in their entirety.

In an example system using the handheld game system described with reference to FIGS. 3-9, the core application may only need to use the wireless network drivers of the game system. In one example, the handheld game system includes one or more drivers for a short-range proprietary wireless network and one or more drivers for a standardized wireless network such as the 802.11 family of standards. The short-range proprietary network can be used to download the kernel or "core" program for a particular site. The core program may provide, for example, color schemes, fonts and basic general information about the site (e.g., restrooms, hours of operation, map of attractions, etc.) The core program may also include any information needed to establish connection with the various access points within the site.

Figure 10:
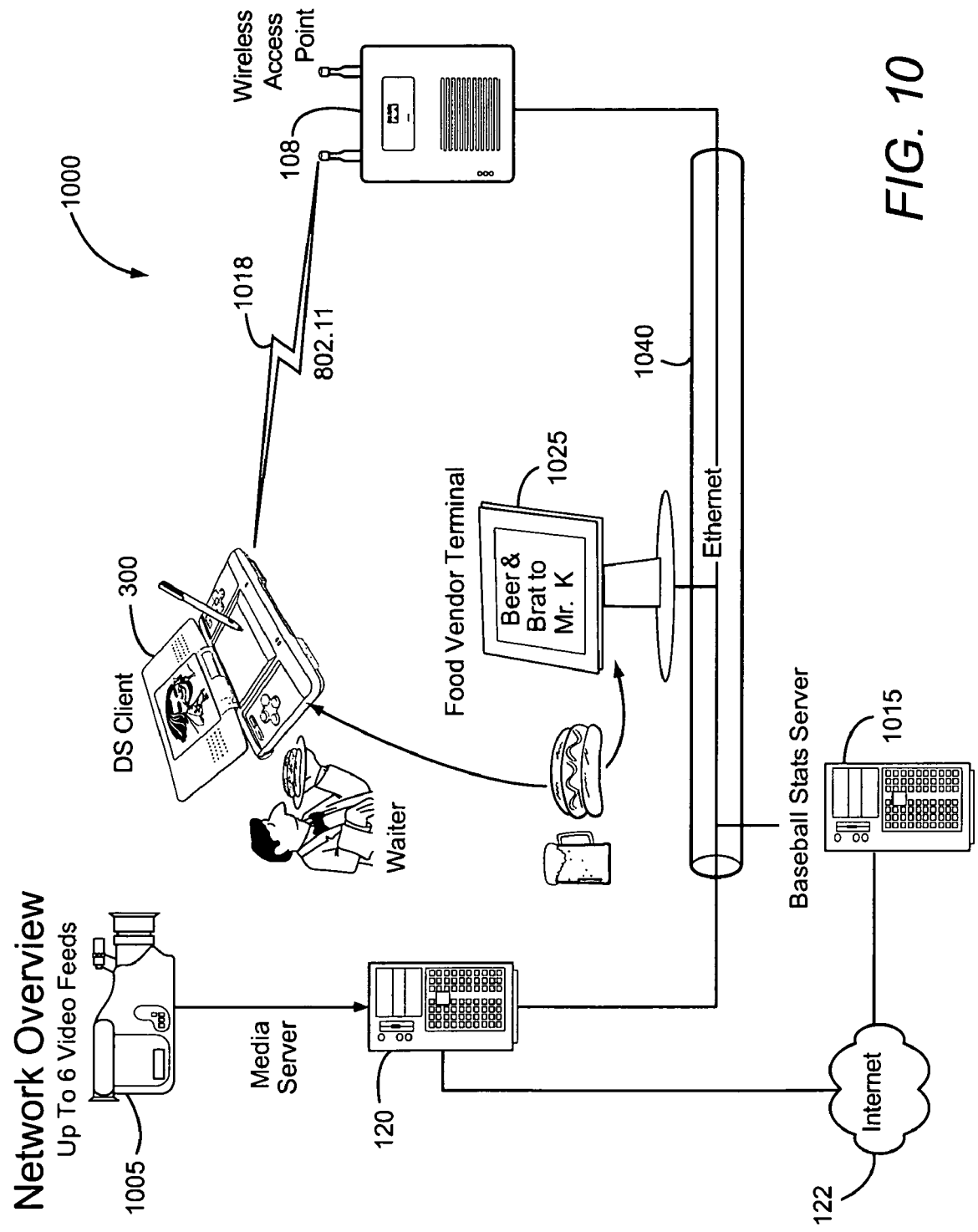
FIG. 10 shows an example network.

FIG. 10 provides an overview of an example wireless consumer network 1000 in which one or more portable game systems of the type described above with reference to FIGS. 3-9 may be incorporated. The discussion below makes reference to an implementation of the network in a stadium for baseball games along the lines shown in FIG. 1A. However, it will be readily apparent that the network is readily applicable to a variety of sporting events including football, basketball, hockey, soccer, track and field, gymnastics, figure skating, and the like, as well as to amusement parks, theme parks, museums, fairs, zoos and the like.

As will be described in greater detail below, network 1000 provides support for various interactive applications including player and game statistics, food ordering and delivery and content delivery (e.g., from a league to which the competing teams belong).

The network includes a plurality of video feeds 1005, a media server 120, a baseball statistics server 1015, wireless access points 108, food vendor terminals 1025 and portable game systems 300.

The handheld information terminal 300 runs a client application that provides a touch menu driven interface that allows a user to select various video feeds, view statistics and order food. Other applications may also be implemented and may depend on the particular environment in which the network is implemented. For example, for football and baseball games, fantasy league applications may be provided to permit users to keep track of statistics for players in the user's fantasy leagues.

The video feeds 1005 are from cameras positioned around the stadium that provide different views of the game. One or more real-time video feeds of the live baseball game taking place at the stadium, and in an example implementation up to six real-time video feeds from different angles, are provided, although it will be readily apparent that a different number of feeds (more or less than six) may be utilized in other implementations. For example, at a baseball game, one feed may be from a camera behind home plate, another from a center field camera looking in at home plate, another from a camera adjacent to the visiting team's dugout, another from a camera adjacent to the home team's dugout, etc. There is no restriction on where the cameras may be positioned to provide views of the game. The video feeds 1005 are supplied to media server 120 as baseband analog video. As described in greater detail below, media server 120 processes the video feeds for distribution as streaming video to handheld game system 300 via wireless access points 108. In response to user inputs, handheld game system 300 may select any one or more of the video feeds for display on the upper and/or lower display screens 332, 388 of the game machine. In this way, the user can select how to view the game on the portable game system. For example, a user sitting behind home plate may select the view from a center field camera.

In the example implementation, no audio is provided. Of course, in alternate implementations, one or more of the video feeds may have associated audio or a single audio feed (e.g., from a local radio or television broadcast of the game) may be associated with all of the feeds. A user may listen to the audio using headphones connected to the handheld game machine by jack 356. Although the video feeds described above are real-time feeds from cameras positioned around the stadium or arena, one or more the feeds may be replay feeds for showing replays of the last play from one or more different angles.

Baseball statistics server 1015 is connected to media server 120 via the internet 122. The baseball statistics server 1015 stores detailed statistics regarding the teams and players playing the current game. These statistics are provided to the media server for distribution to handheld game system 300 via wireless access points 108. In one example implementation, the statistics for the teams and players may be downloaded to the media server at the beginning of the game and stored in a memory of the server, from where they are distributed to the handheld game system. In other implementations, the statistics may be downloaded from the statistics server to the media server periodically throughout the game.

In addition, the FIG. 10 system may be modified to include a local statistics server (e.g., in or around the stadium or arena) that may be connected to the local area network 1040 (designated in FIG. 10 with the legend Ethernet) either directly or through the media server 120. The local statistics server may provide more limited statistics than the server 1015, but may provide real-time updates to these more limited statistics throughout the game. Thus, when a particular player comes to bat, certain limited box score statistics such as current average, number of hits, home runs, runs batted in, and stolen bases, as well as results of prior at-bats in the current game, may be provided to handheld game system 300 from the local statistics server. Other statistics such as a player's full career statistics may be provided by server 1015, but these statistics may only be updated periodically during the game or may be updated only after the game is completed.

Although not shown in FIG. 10, the media server 120 may also be connected to video feeds that provide video and/or audio for out-of-town games. The media server may provide these out-of-town game feeds to portable game systems as streaming video. A menu of these out-of-town games may be provided on the lower display screen 332 and a user may select one of the feeds for display on upper and/or lower screens 332, 388.

Handheld game system 300 also communicates with food vendor terminals 1025. FIG. 10 shows only one terminal 1025, but such terminals may be distributed throughout the stadium or arena at different snack bars, restaurants, etc. A user of the portable game machines can see food and drink menus from the various food vendors on one or both displays of the portable game machine and make selections using the touchscreen or one of the other input devices. In one example implementation, the upper display screen 388 may provide general information about the food vendor (e.g., type of cuisine, daily specials, hours of operation, etc.) and the lower display screen 332 may provide a menu from which food and drinks may be selected using a stylus.

The menu selections are communicated (along with information identifying the user, e.g., a seat number which be manually entered by the user) via the access point and the local area network 1040 to the appropriate food vendor. When the menu selections have been prepared, a waiter delivers the selections to the user. Payment may be made to the waiter (e.g., in cash) or using a credit/debit/check card by entering appropriate information into the portable game system at the time the order is placed.

Wireless access points 108 are distributed throughout the stadium or arena in a manner that provides desired network coverage. For example, it may be desirable to provide coverage throughout the entire stadium or arena or only in a limited portion thereof (e.g., in so-called "luxury" boxes). The desired coverage will dictate the manner in which the access points are distributed and the number of access points needed. The access points may be configured for any conventional wireless communication protocol such as Bluetooth; any type of 802.11 (WiFi) protocol; HiperLAN/1 protocol; HiperLAN/2 protocol; HomeRF protocol; etc.

Figure 11:
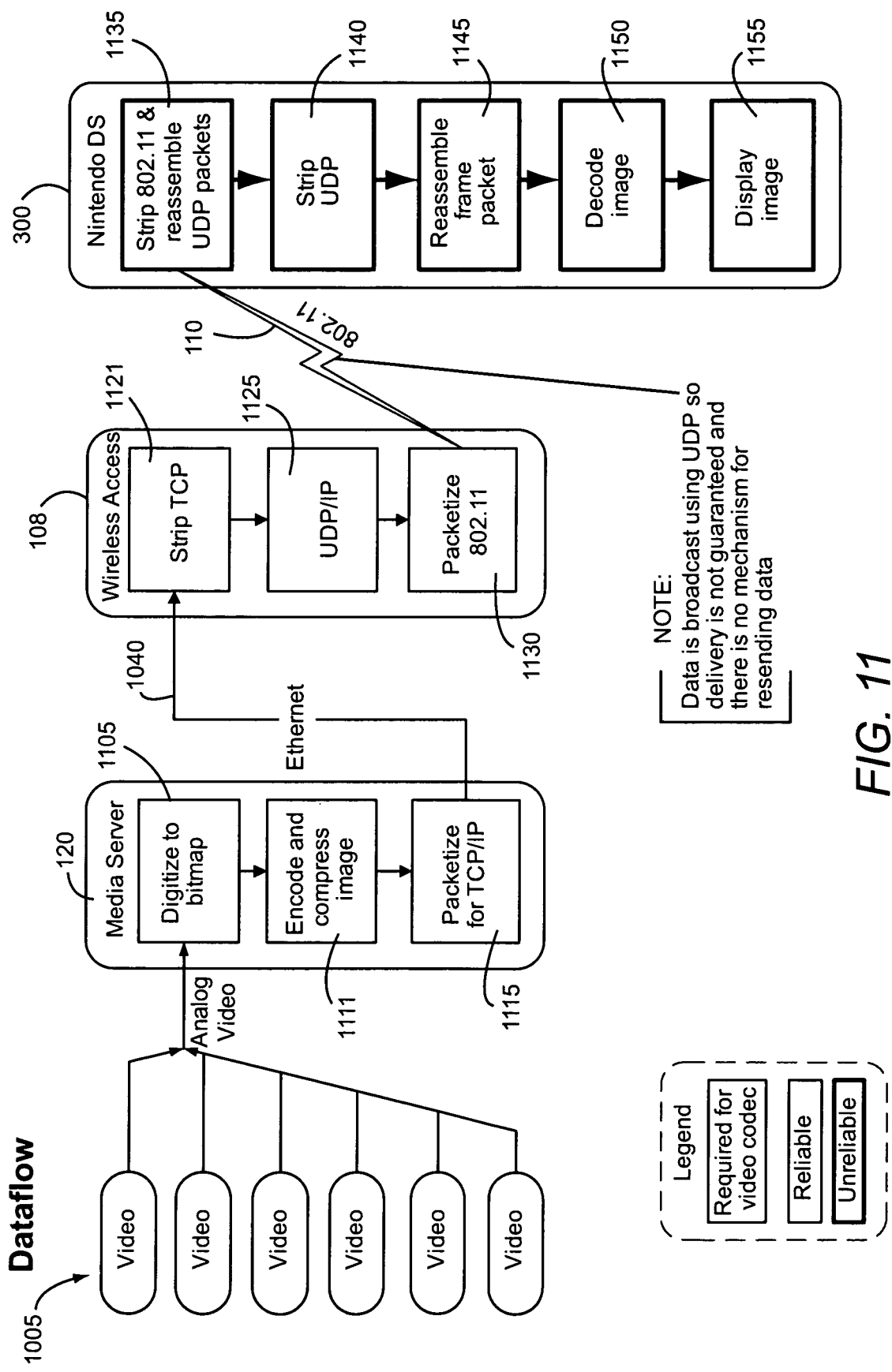
FIG. 11 shows an example dataflow in the network of FIG. 10.

FIG. 11 shows an example dataflow from the video feeds 1005 to media server 120 to a wireless access point 108 to a handheld game system 300. The video feeds 1005 provide analog video to media server 120, where the video is digitized to bitmaps at 1105, the bitmaps are encoded and compressed at 1111 and packetized for TCP/IP at 1115. The packetized information is communicated over local area network 1040 to wireless access point 108.

The encoding may, for example, provide 15 frames per second at 256×192 pixels per video feed for up to six video feeds. In the example network, the encoding is preferably real time encoding with a 500 ms maximum acceptable latency so that continuous real time performance can be maintained. All feeds (six in the example network) are interleaved into one video stream for transmission over a single wireless channel as discussed in greater detail below.

Wireless access point 108 provides connection-oriented (TCP/IP) and connectionless (UDP) networking access for the network. At wireless access point 108, the TCP is stripped from the information at 1121. The information is then adapted for transmission via a broadcasting protocol such as UDP/IP at 1125. The information is then packetized for transmission using a wireless protocol such as 802.11 at 1130. The packetized information is then broadcast over the wireless link 110.

The information broadcast over wireless link 110 is received by handheld game system 300 and the 802.11 is stripped and the UDP packets are reassembled at 1135. The UDP is stripped at 1140 and the frame packet is reassembled at 1145. The image is decoded at 1150 and displayed on one or both of the display screens 332 and 388 at 1155.

In the example network, the decoder in the handheld game machine degrades gracefully with data errors and does not crash or hang-up on missing or bad data. That is, the decoder presents the best possible image with missing or bad data. The decoder may support error correction. Each video channel (256×192×16 bits) should fit within 128 kbps bandwidth. The output from the decoder is a bitmap that is displayed by the client application of the portable game system.

Although not shown in FIG. 11, a similar data flow may be provided for non-video information (e.g., statistics and other content) for output by the handheld game system 300.

FIGS. 12A and 12B shows example protocol stacks. With reference to FIG. 12A, for example, at the access point 108 and the handheld game system 300, the stack includes a network packet, UDP, IP and WiFi driver. With reference to FIG. 12B, the access point stack includes a network packet, UDP, IP and WiFi driver and the portable game system stack includes a state machine, UDP, IP and WiFi driver.

Figure 13:
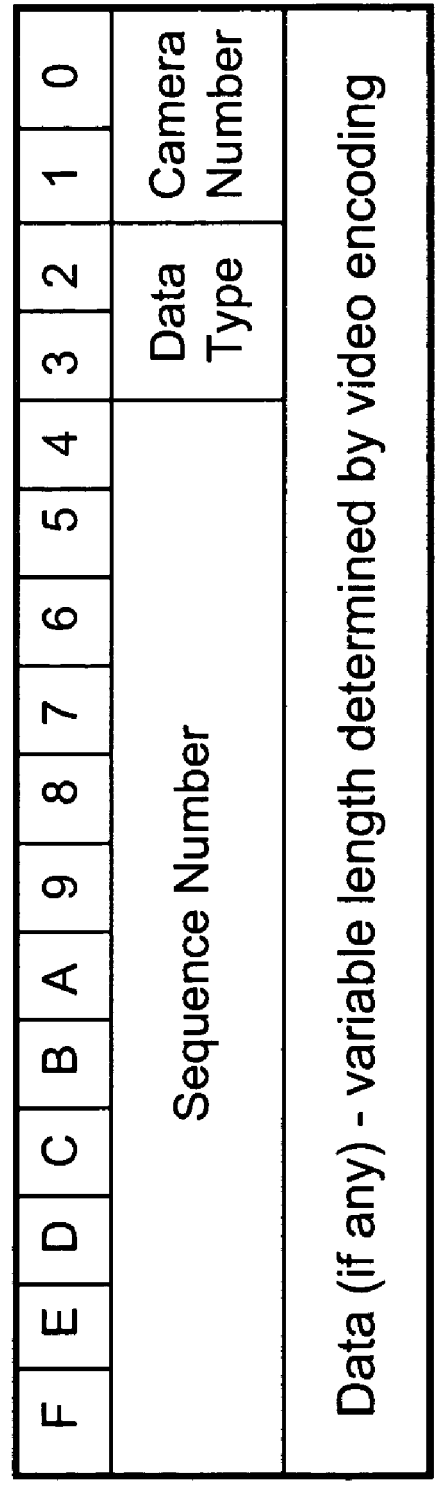
FIG. 13 shows an example network packet format.

FIG. 13 shows an example network packet format which includes a 16-bit header with a 2 bit camera number field, a 2-bit data type field, and a 12-bit sequence number field. The data size is determined by the video encoding.

FIG. 14 shows an example UDP data format which includes a 16-bit source port number, a 16-bit destination port number, a 16-bit UDP length, a 16-bit UDP checksum and variable length data.

FIG. 15 shows an example IP header.

FIGS. 16A-16E shows various example screens associated with the FIG. 10 system.

Figure 6:
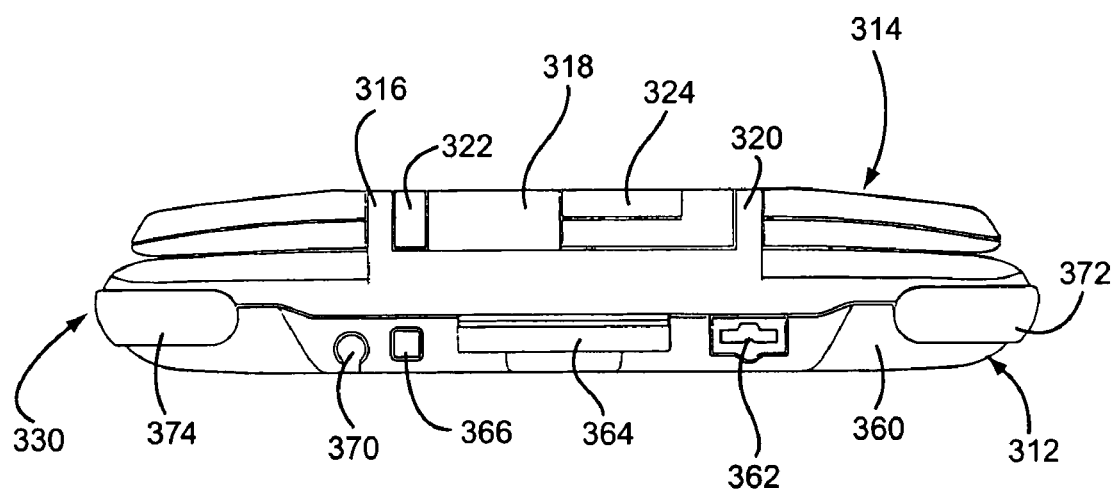
FIG. 6 is a rear elevation of the game system shown in FIG. 5.
Figures 2, 16A:
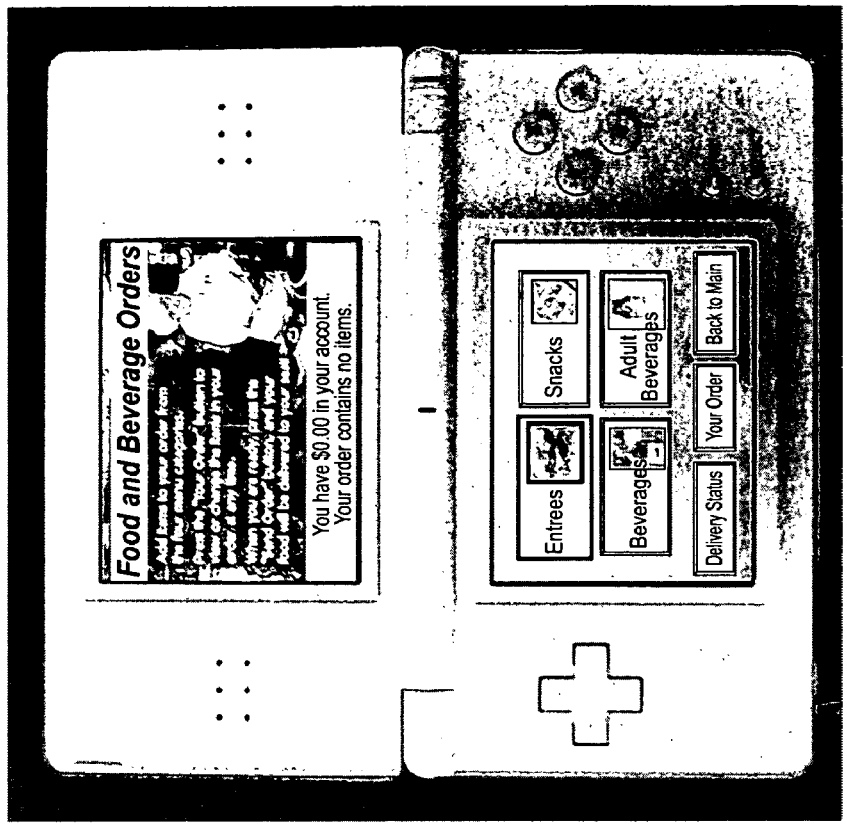
FIGS. 16A-16E show various example screens for the user network described herein in which the game system shown in FIGS. 3-6 is used as a handheld information terminal.
Figures 1, 16A:
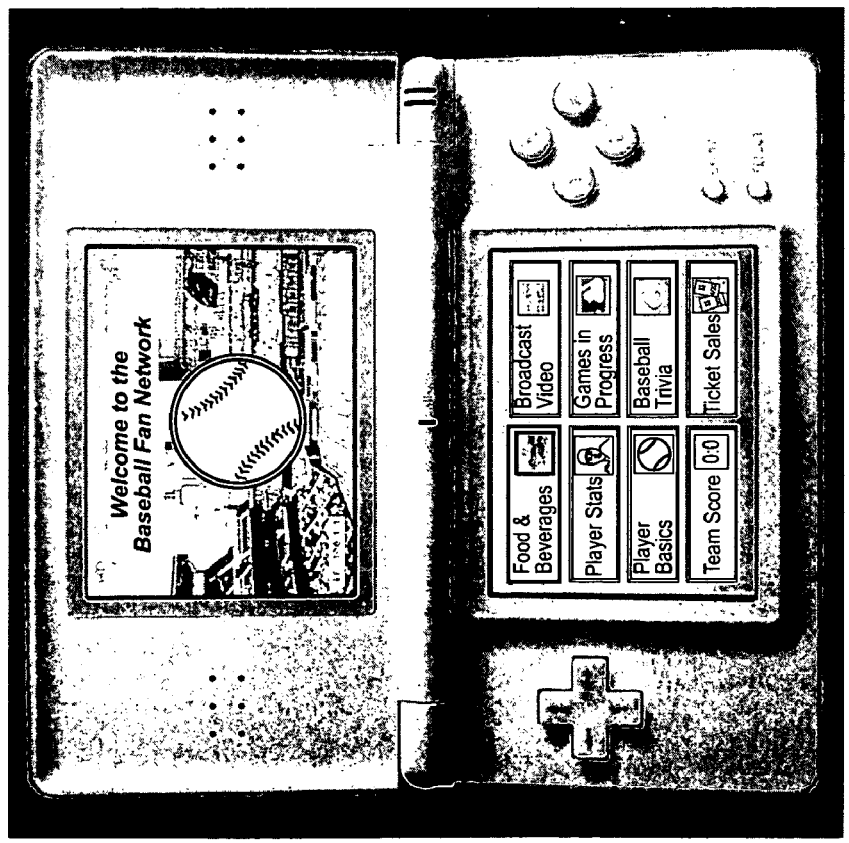
Figures 4, 16A:
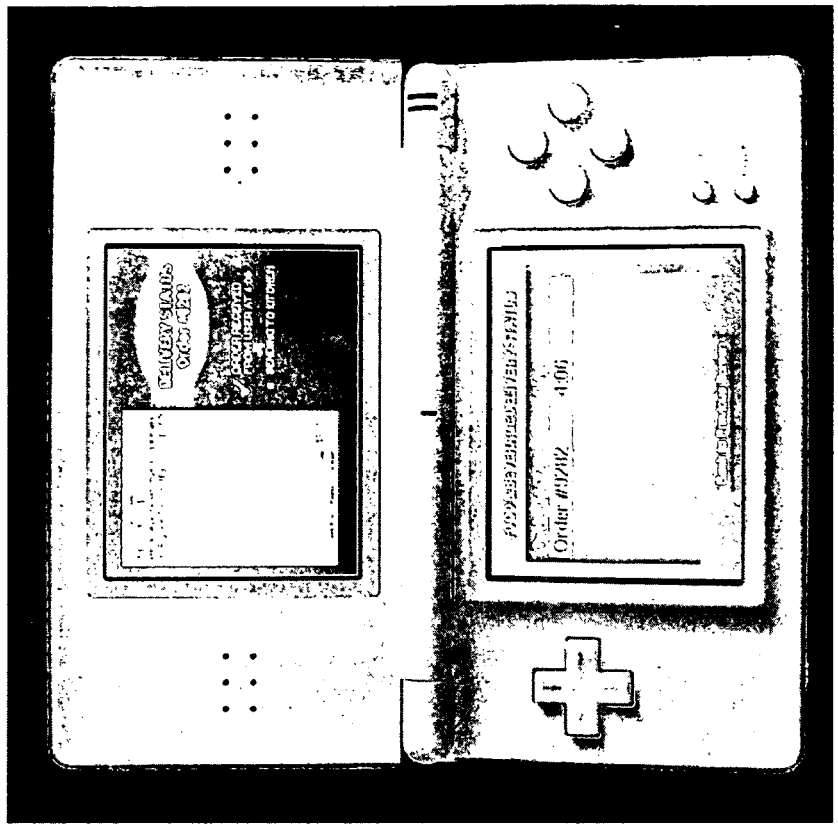
Figures 3, 16A:
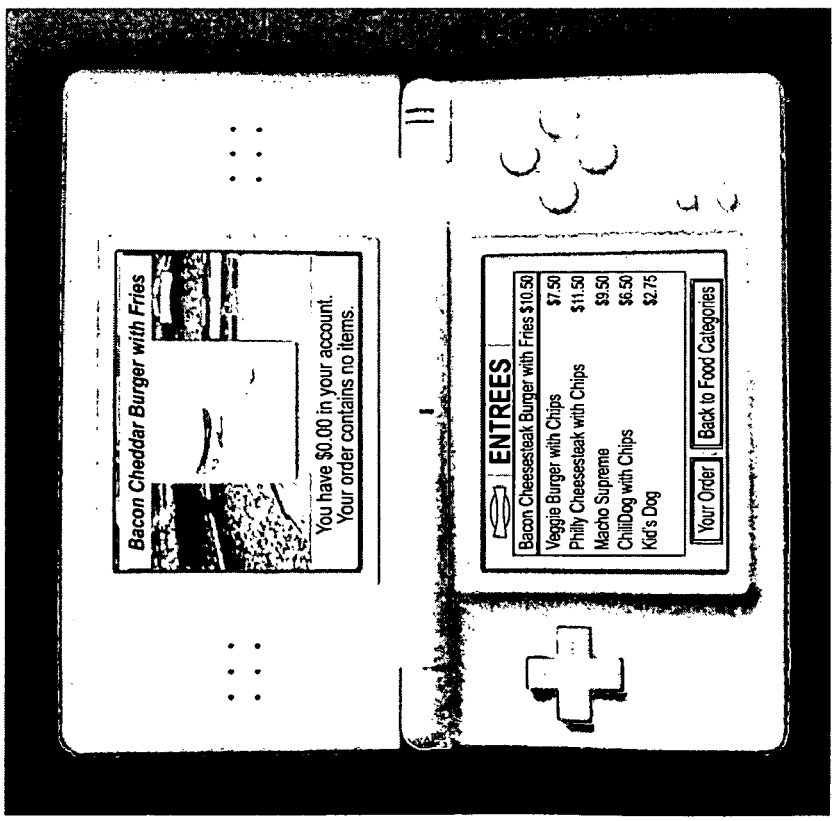
Figures 6, 16A:
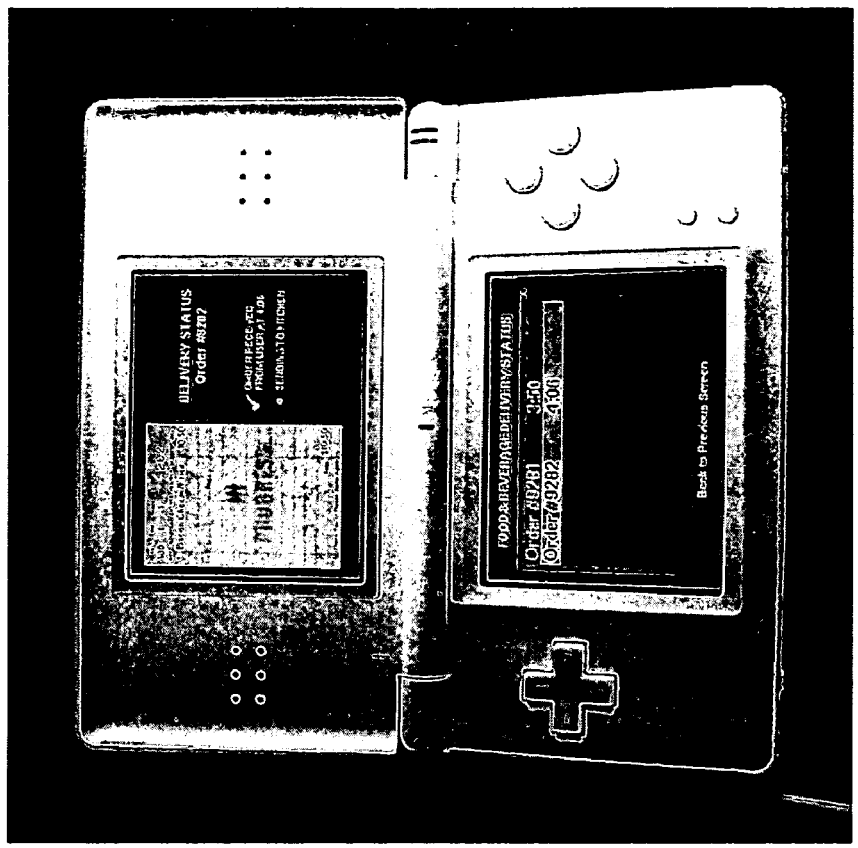
Figures 5, 16A:

FIG. 16A-1 through FIG. 16A-6 show example screens associated with food and beverage ordering. As can be seen, lower (touch)screen 332 provides various options ("hotspots") that may be selected using a stylus, while upper screen 388 displays information relating to a current selection or highlighted option.

Figure 3:
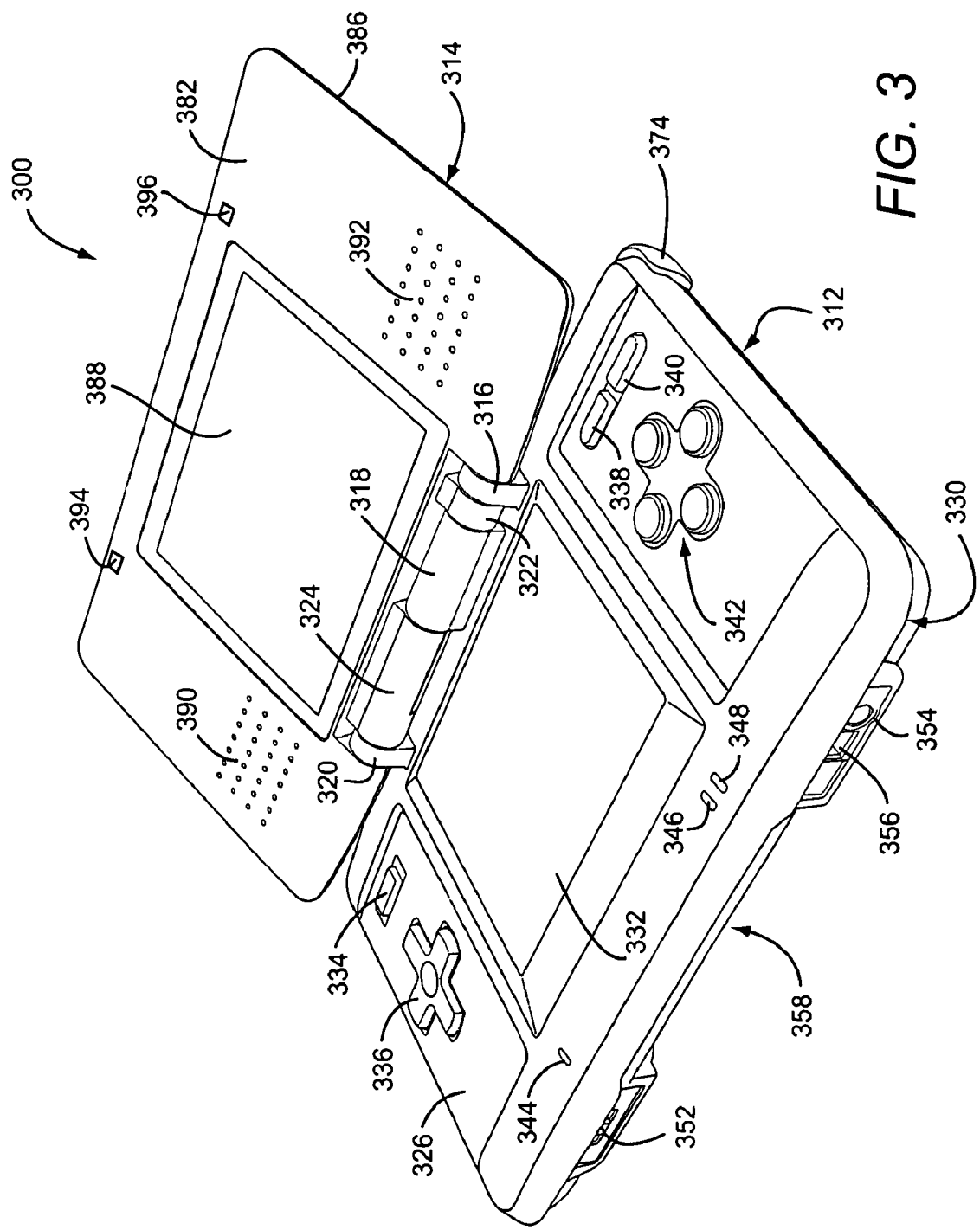
FIG. 3 is a perspective view of a particularly advantageous implementation of information terminal 106, 162 as an electronic game system, with the system shown in an open, ready-to-use orientation.
Figures 2, 16B:
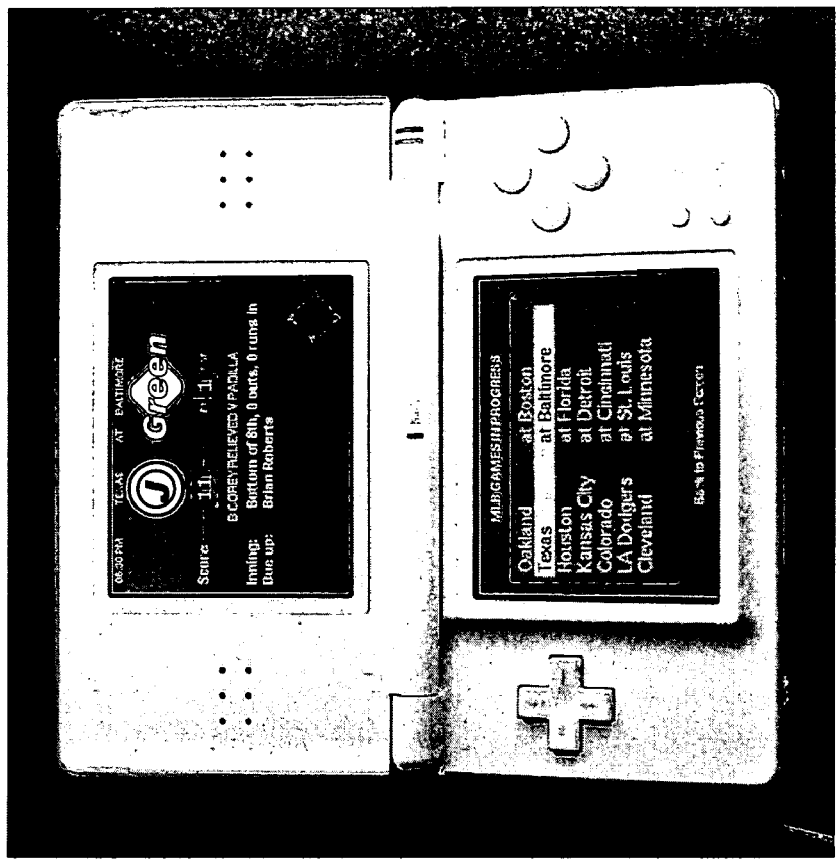
Figures 1, 16B:
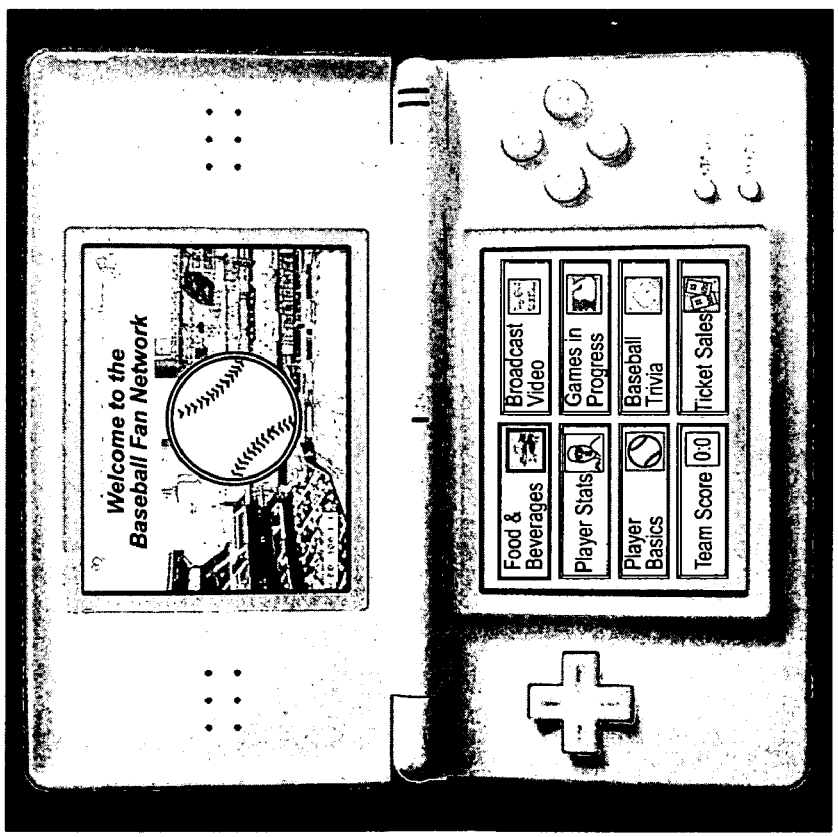

FIG. 16B-1 through FIG. 16B-3 show example screens associated with obtaining information about out-of-town games. As can be seen, the user is able to make various menu selections so a display of the final score in the LA Dodger-St. Louis game is shown on the upper screen 388 in FIG. 16B-3.

Figures 1, 16C:
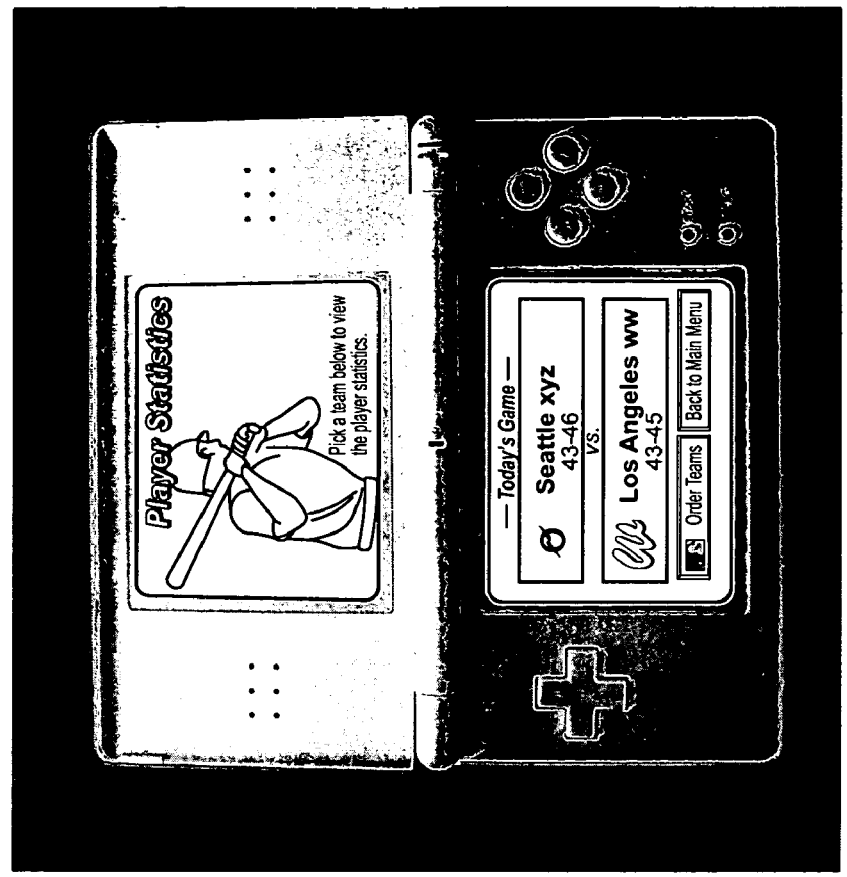
Figures 3, 16B:
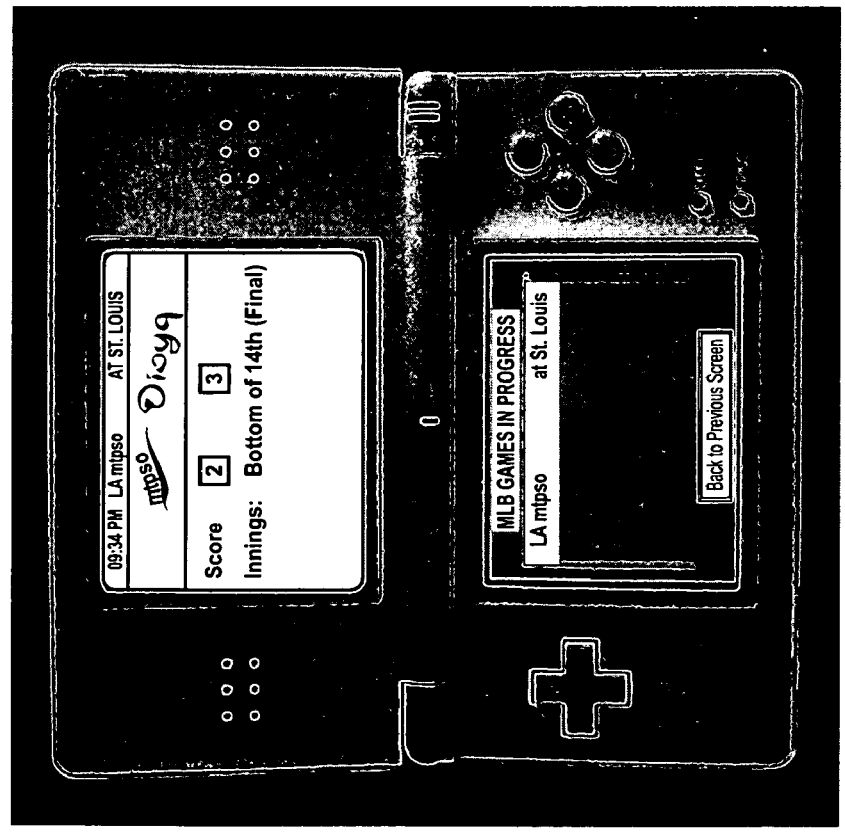
Figures 3, 16C:
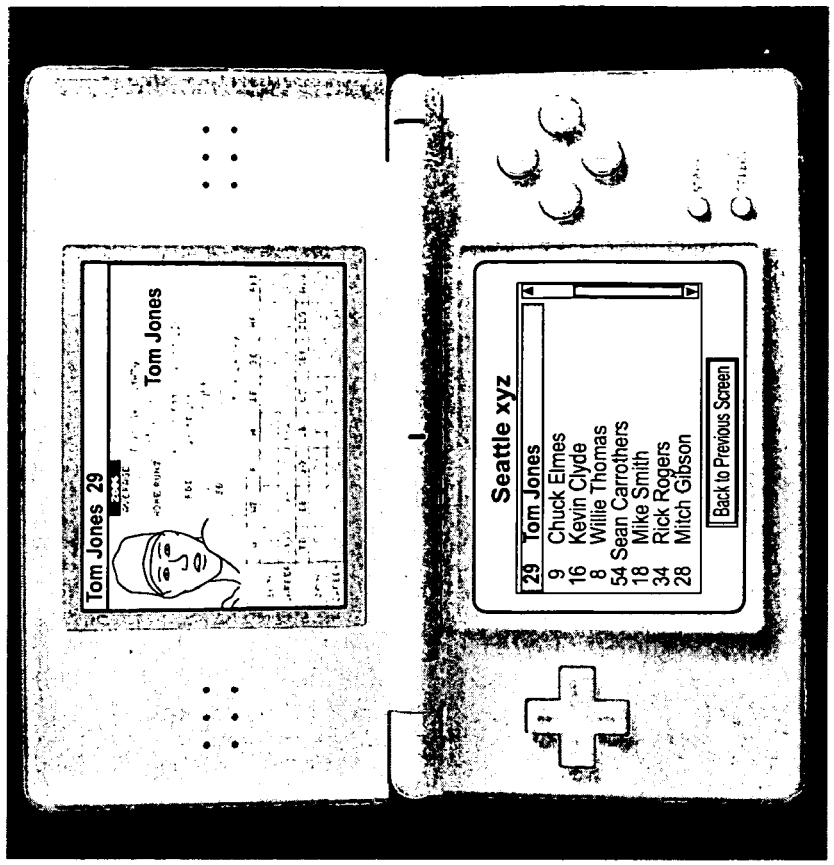
Figures 2, 16C:
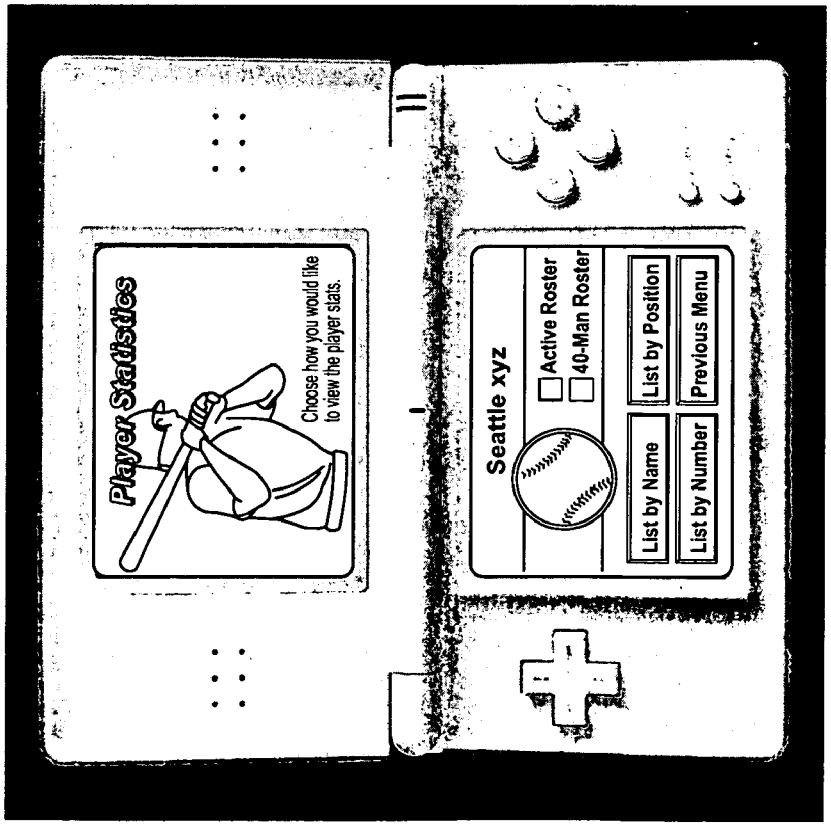

FIG. 16C-1 through FIG. 16C-3 show example screens associated with obtaining player statistics. As can be seen, the user is able is make various menu selections so a display of the statistics for a particular player is shown on the upper screen 388 in FIG. 16C-3. The lower screen 332 in FIG. 16C-3 can be used to change the player whose statistics are displayed on the upper screen 388.

Figures 2, 16D:
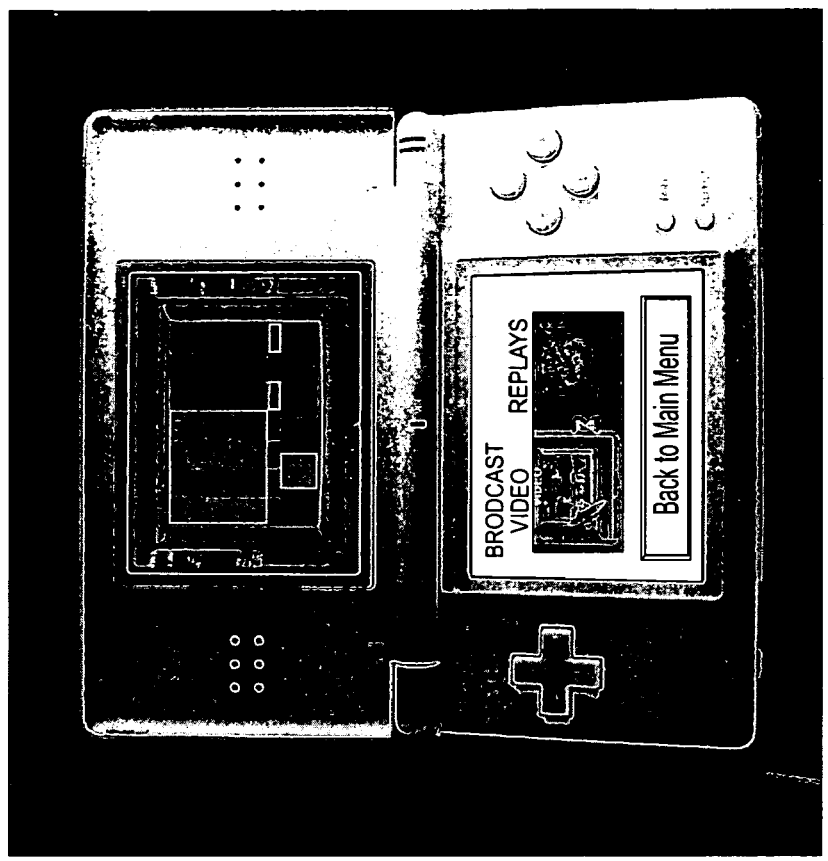
Figures 1, 16D:
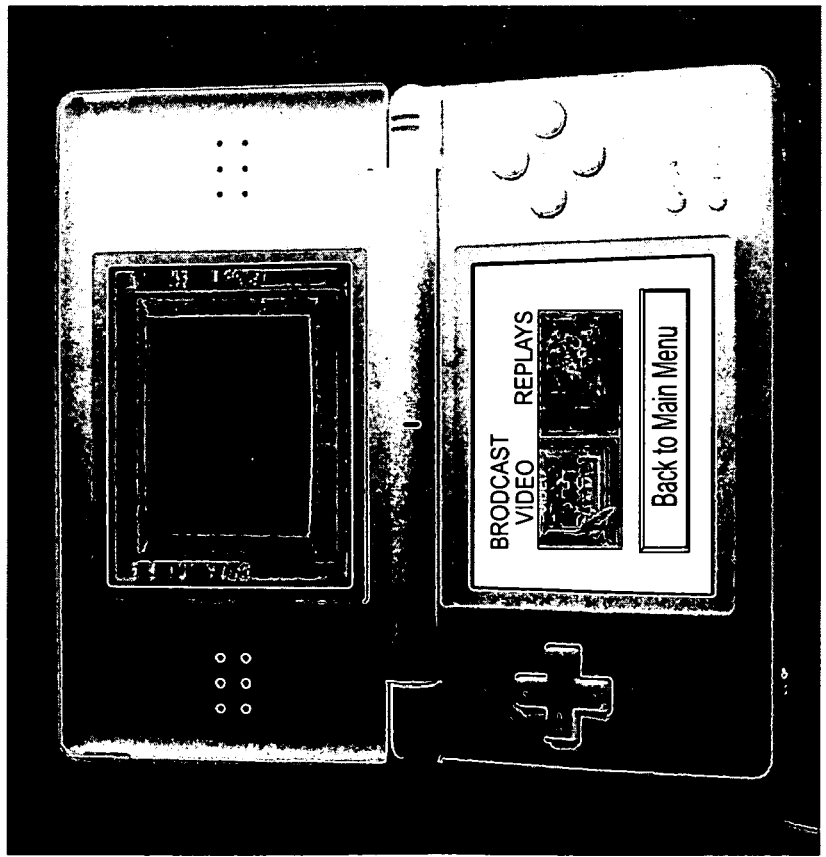

FIG. 16D-1 through FIG. 16D-2 show example screens associated with displaying video associated the baseball game. The user is able to select between the broadcast feed and replays.

Figures 2, 16E:
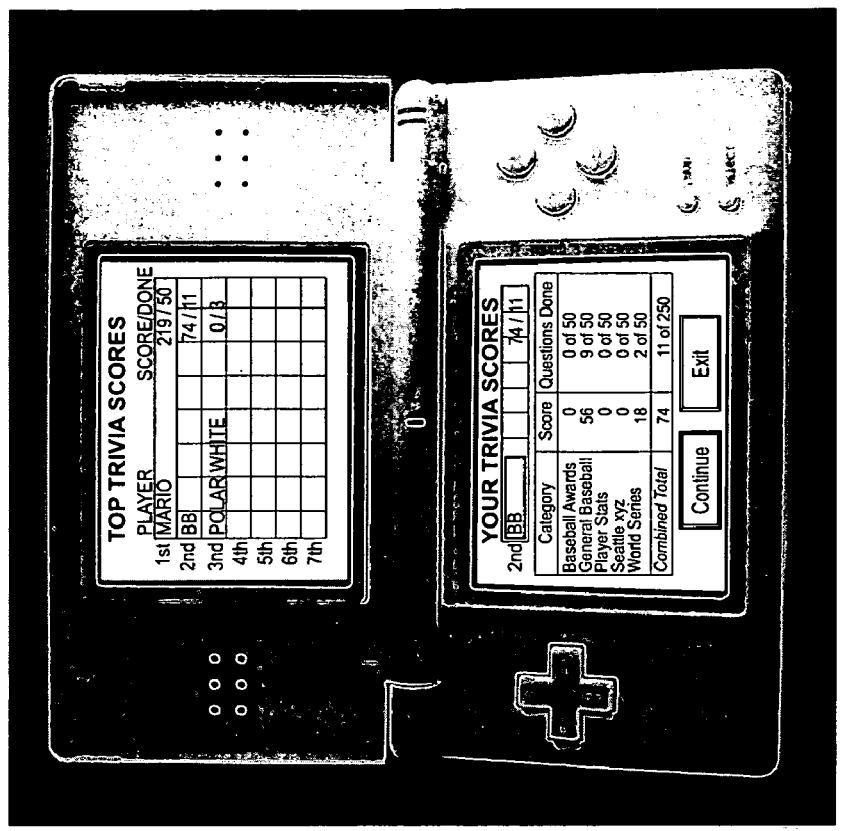
Figures 1, 16E:
Figures 4, 16E:
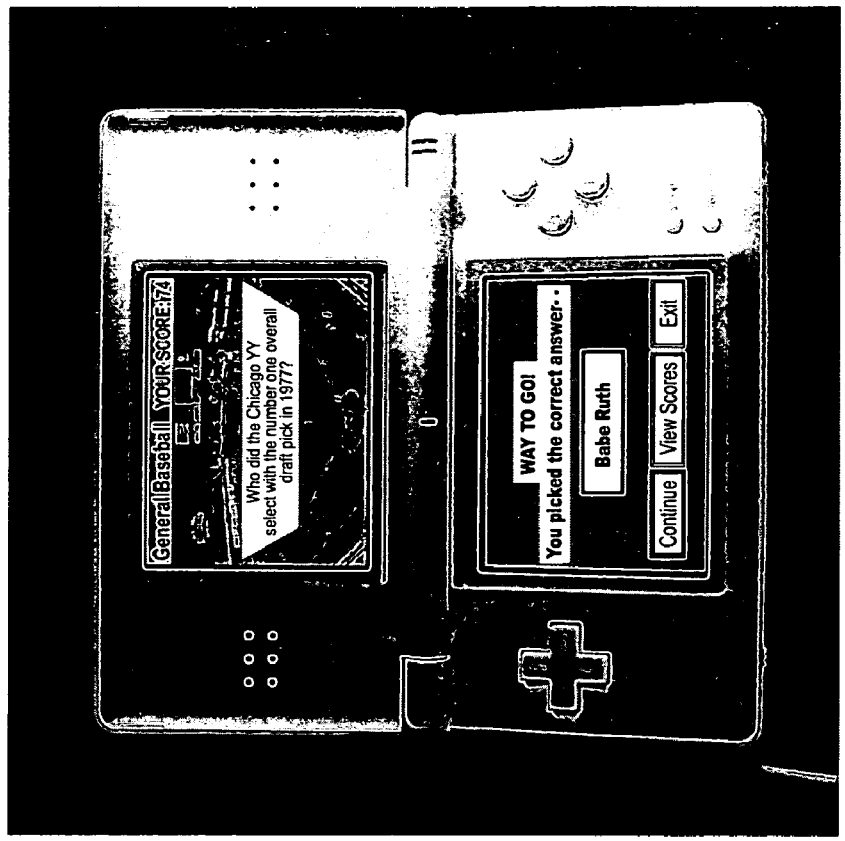
Figures 3, 16E:
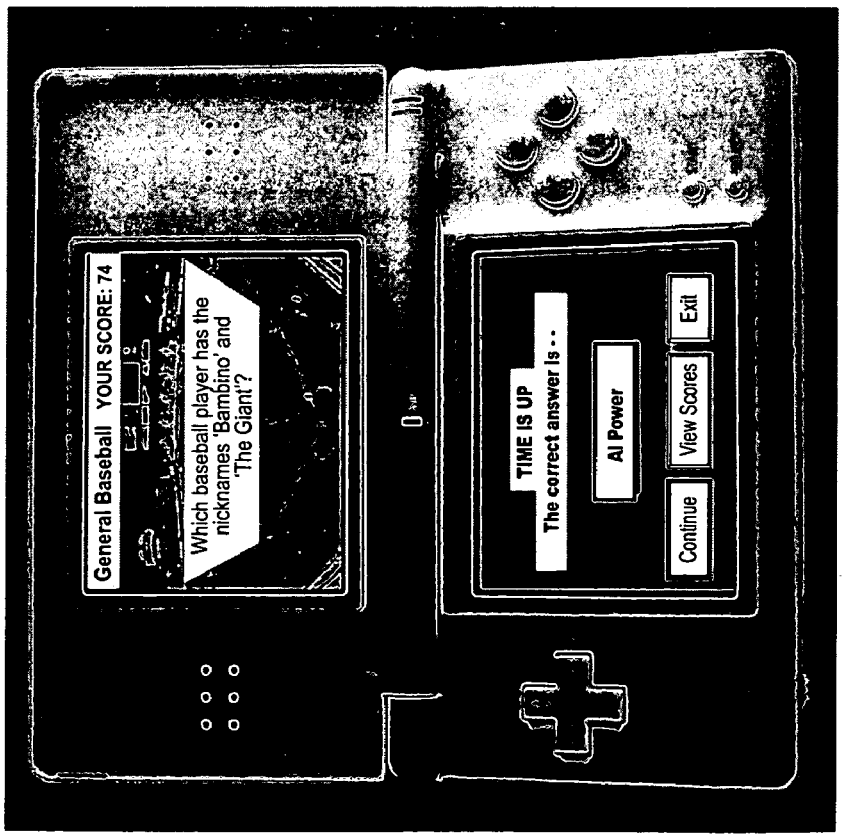

FIG. 16E-1 through FIG. 16E-4 show example screens associated with a trivia game.

As described above in connection with the FIG. 1A system, a user is able to select from among various applications. In systems based on the FIG. 1B architecture, applications may be "pushed" to the handheld information terminals as the users move around the site from access point to access point and are, for example, waiting in line for an attraction. The user can manually exit from the pushed application to access other core applications such as, for example, the waiting times at other attractions.

Another example "push" application involves a user moving through exhibits at a museum. As a user approaches a particular exhibit or room of exhibits, information about that exhibit or the exhibits in the room is pushed to the handheld information terminal so that the user can automatically see the information without requesting that the information be sent to the terminal.

As noted above, one example application in an amusement park setting is providing an indication of the wait time for the attraction. Additionally, based on the current wait time, 170 system server could determine a "fast pass" price that would permit someone to go to the head of the line or get on a shorter fast pass line. The "fast pass" price may increase as a function of current wait time so that the longer the current wait time, the more expensive the "fast pass" price.

Moreover, in busy amusement or theme parks, users often have significant down time between rides and waiting on line for rides. As described above, the wireless user network described herein allows the amusement or theme park operator to be "in contact" with the user during this down time with special offers, advertisements, etc., thereby providing additional revenue opportunities.

The user may configure the information terminal to provide certain alerts visually and/or aurally and/or, if the handheld information terminal includes a vibration mechanism, tactilely. For example, in a theme park or amusement park, a user may configure the handheld information terminal to generate an alert when the wait time for a user-specified attraction (or attractions) becomes less than a user-specified wait time. For example, the user may configure the handheld information terminal to provide an alert when the wait time for the rollercoaster becomes less than 45 minutes. The specification of particular attractions for this feature may be accomplished by making selections from a menu listing the attractions for which this feature can be used. The specification of a particular wait time can be done by entering the time using, for example, an on-screen keyboard or making a selection from a list of times (e.g., 15 minutes, 30 minutes, 45 minutes, 1 hour, etc.).

The user may also specify that certain information be pushed to the information terminal while other information be downloaded only upon request. For example, in the context of a shopping mall, a user may specify that information relating to sales on DVDs and men's clothing be pushed to the information terminal.

As noted above, interactive location specific applications for the client handheld information terminal are easily developed using a scripting program such as the domain specific graphical scripting program CNScript®. This allows quick development of local applications so every type of wireless network can quickly develop the interactive application required by the particular genre of the network.

The scripting program preferably utilizes application appropriate image files (e.g., JPEG image files) that may be directed to the top or bottom screen. The images may be textual or graphical or any combination of text and graphics. Bottom screen images may contain "hotspots" that, by using the touch screen feature of a handheld gaming device such as that described above, will perform an action (ScriptActs®). In the case of a handheld information terminal along the lines of FIGS. 3-9, the touch may invoke either a new top screen or a new bottom screen. The new bottom screen may also have hotspots. Other typical actions may be to select a video feed for the top screen, invoke an order for food or beverage, select the answer to a quiz, or invoke any of the actions described elsewhere herein.

Hotspots can loaded into the information terminal using simple scripts. By using a hot spot editor (e.g., the CNScript® JPEG Graphical Hot Spot Editor (GraHSE®)) to define the X, Y origin along with the width and height of the hotspot within the image and associating the appropriate action, the basics for a custom interactive application that is specific to the particular instance of wireless network may be quickly developed.

The Graphical Hot Spot Editor allows simple hotspot identification and action association. For example, the OPEN command may be used to select from a list of the images created for the application. The mouse is used to define a hot spot by holding down the right button and dragging a box around the desired area. The box can be started from any of the four corners. When the box is complete and the mouse button released, a list box will drop down with a list of actions to be associated with the hot spot. The appropriate action is clicked and another box will drop down with a list of properties for the particular type of action. If the action is to display a new screen, a selection is made between a top or bottom screen, and an image is selected from a drop down list. For an action such as ordering from a menu, whether it is food or other merchandise, all items will have an assigned ID number tag. The drop down menu will contain these ID number tags that can be selected.

Example ScriptActs include selecting a new top screen; selecting a new bottom screen; sending a command string to a server; sending a data string to a server; go back; go forward; scroll down; scroll up.

Example command strings include selecting a video Feed N to top screen; sending a food order N; sending a merchandise order N; sending a trivia answer N.

As described above, a handheld information terminal can act as a "location specific user assistant" with a touch screen interface but no embedded application program. As such, the memory (e.g., RAM) within the handheld information terminal is loaded with a core application program. This is done by physically moving the handheld information terminal to close proximity of a "download station". A download station is a short range wireless server for handheld information terminals which may use a proprietary protocol. In this way, only intended content may be loaded, providing security and control. The core application program is preferably loaded only by the user prompting download to occur. In this way, the user maintains control and grants permission for the program download. Once the core application program is loaded, (incremental) content may be automatically pushed to the handheld information terminal or content may be provided in response to a user request.

The handheld information terminal may use two (or more) wireless interfaces, one secure and proprietary for loading tightly controlled content, the other standard for loading incremental content. The handheld information terminal may include processing circuitry (e.g., a central processing unit), memory (e.g., RAM), a display (e.g., an LCD display(s)); and a touch screen interface. The handheld information terminal may have no embedded program media and the core program need only use wireless drivers for both standard and proprietary protocols.

As the user wanders from location to location, content is pushed to the handheld information terminal via a standard wireless protocol provided, for example, via relatively long range access points. These wireless access points could provide standard Wi-Fi or any other standard protocol.

Content pushed to a handheld information terminal from standard access points include audio, video, graphics, scripts and program fragments. This content is stored only on servers connected to the access points.

The handheld information terminal can be implemented as a location specific user assistant scripting interpreter, allowing minimum content storage on the handheld information terminal, with content streamed from a server under script control. The streamed content can include, but is not limited to, audio, video and graphics. Scripts can be easily updated and changed, even by relatively unskilled programmers. The core application program can include a script interpreter. The handheld information terminal can request new program fragments, hot spots, audio video and graphics based on scripts. Program fragments enhance the core application program, allowing the handheld information terminal to morph into new types of location specific user assistants with a look and feel specific to the new location. Hot spots allow user interaction with the handheld information terminal via the touch screen, with hot spot specific sensory response from graphics, audio and video.

The systems and methods described herein also provide for securing data over a wireless link for credit card purchases and entry of personal information using multiple layers of standard encryption (DES), which may be coupled with a top layer of proprietary encryption.

The handheld information terminals can use dynamic program memory allocation, keeping a minimum application (kernel) in memory (e.g., RAM), while moving necessary code and data to RAM from servers and discarding (de-allocating) unnecessary code and data.

User identification and authentication may be provided via an exchange of data between the handheld information terminal and server based on a mathematical operation using user's name and MAC address of the handheld information terminal. This mathematical operation stores a unique number (e.g., a 16 byte number) in the handheld information terminal which is used by the server to authenticate the user's identity. The server performs a series of operations using the unique number to ensure that the handheld information terminals security has not been compromised. An example implementation of this process may be as follows:

1. Seed a pseudorandom prime number generating algorithm with a number generated from the handheld information terminal's MAC address. Create sixteen (16) prime numbers.
2. Create two vector spaces, one with 8 complex values from the 16 prime numbers, the other with 8 complex numbers derived from a Boolean operation of a number from application specific server and the user's name.
3. Mathematically convolve these two vectors into a new vector space. Store the 16 bytes resulting from the new vector (8 real values and 8 imaginary values) locally in the handheld information terminal.
4. The server reads the 16 byte value and MAC address from the handheld information terminal.
5. The server convolves these two values, and then uses a database lookup to identify the user's name.
6. The server then convolves the result with a value based on the user's name.
7. If the result is not a zero value vector, then security has likely been compromised.

Generally speaking, the systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program or script of instructions to perform desired functions by operating on input data and generating appropriate output. The techniques may be implemented in one or more computer programs or scripts that are executable on a programmable system including at least one programmable processor coupled to receive data and instructions from, and to transmit data and instructions to, a data storage system, at least one input device, and at least one output device. Suitable processors include, by way of example, both general and special purpose microprocessors. Generally, a processor will receive instructions and data from a read-only memory and/or a random access memory. Storage devices suitable for tangibly embodying computer program instructions and data include all forms of volatile and non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits). The computer program instructions or scripts may also be provided as data signals embodied in a carrier wave or other propagation medium via a communication link (e.g., a modem or wired or wireless network connection).

While the systems and methods have been described in connection various embodiments, it is to be understood that the system and method are not to be limited to the disclosed embodiment, but on the contrary, are intended to cover various modifications and equivalent arrangements.

We claim:

1. A portable handheld information terminal for use in a local area network (LAN) comprising wireless access points associated with a site and with a plurality of attractions of the site, the portable handheld information terminal comprising:
   first and second display screens, the first display screen comprising a touch sensitive display screen; and
   wireless communication circuitry for wireless communication with a first wireless access point using a first wireless communication mode and with a second wireless access point using a second different wireless communication mode,
   wherein a core application executable by the portable handheld information terminal is downloaded to the portable handheld information terminal via the first wireless access point using the first wireless communication mode and incremental content is downloaded to the portable handheld information terminal via the second wireless access point using the second wireless communication mode, and
   wherein the core application includes a script interpreter and the incremental content includes a script to be provided as an input to the core application.

2. The portable handheld information terminal according to claim 1, wherein the contents of the first and second display screens automatically change in dependence on the wireless access point with which the portable handheld information terminal communicates.

3. The portable handheld information terminal according to claim 1, wherein one or more hot spots are displayed on the touch sensitive display screen and touching of the hot spots changes the display on the second display screen.

4. The portable handheld information terminal according to claim 1, wherein the first wireless communication mode is an ad-hoc mode and the second wireless communication mode is an infrastructure mode.

5. The portable handheld information terminal according to claim 1, wherein the first communication mode is a secure mode.

6. The portable handheld information terminal according to claim 1, wherein the first wireless communication mode is a prompt mode in which the core application is downloaded only upon prompting by the user, and the second wireless communication mode is a push mode in which the incremental content is automatically downloaded without any prompting from the user.

7. The portable handheld information terminal according to claim 1, wherein the portable handheld information terminal is a mobile telephone.

8. A portable handheld information terminal for use in a local area network (LAN) of a site, the portable handheld information terminal comprising:
 wireless communication circuitry configured to wirelessly communicate with a system server of the LAN via a plurality of wireless access points of the LAN; and
 a processor configured to execute a core application,
 wherein when the portable handheld information terminal is within a wireless communication range of a first wireless access point, the wireless communication circuitry wirelessly connects to and receives from the system server the core application via the first wireless access point using a first wireless communication mode, and the processor executes the core application to provide general content relevant to the site,
 wherein when the portable handheld information terminal is within a wireless communication range of a second wireless access point associated with an attraction of the site, the wireless communication circuitry wirelessly connects to and receives from the system server incremental content relevant to the attraction via the second wireless access point using a second wireless communication mode, and the processor executes the core application using the incremental content to provide content specific to the attraction, and
 wherein the core application includes a script interpreter and the incremental content includes a script to be provided as an input to the core application.

9. The portable handheld information terminal according to claim 8, wherein the first wireless communication mode is an ad-hoc mode and the second wireless communication mode is an infrastructure mode.

10. The portable handheld information terminal according to claim 8, wherein the first communication mode is a secure mode.

11. The portable handheld information terminal according to claim 8, wherein the first wireless communication mode is a prompt mode in which the core application is downloaded only upon prompting by the user, and the second wireless communication mode is a push mode in which the incremental content is automatically downloaded without any prompting from the user.

12. The portable handheld information terminal according to claim 8, wherein the portable handheld information terminal is a mobile telephone.

13. A method of operating a local area network (LAN) of a site, the LAN comprising a system server and a plurality of wireless access points, the method comprising:
 wirelessly downloading a core application from the system server to a portable handheld information terminal via a first wireless access point using a first wireless communication mode when the portable handheld information terminal is within a wireless communication range of the first wireless access point, the core application providing general content relevant to the site when executed by the portable handheld information terminal; and
 wirelessly downloading incremental content relevant to an attraction of the site from the system server to the portable handheld information terminal via a second wireless access point associated with the attraction using a second wireless communication mode when the portable handheld information terminal is within a wireless communication range of the second wireless access point, the core application using the incremental content to provide content specific to the attraction when executed by the portable handheld information terminal,
 wherein the core application includes a script interpreter and the incremental content includes a script to be provided as an input to the core application.

14. The method according to claim 13, wherein the first wireless communication mode is an ad-hoc mode and the second wireless communication mode is an infrastructure mode.

15. The method according to claim 13, wherein the first communication mode is a secure mode.

16. The method according to claim 13, wherein the first wireless communication mode is a prompt mode in which the core application is downloaded only upon prompting by the user, and the second wireless communication mode is a push mode in which the incremental content is automatically downloaded without any prompting from the user.

17. The method according to claim 13, wherein the portable handheld information terminal is a mobile telephone.

18. A portable handheld information terminal for use in a local area network (LAN) comprising wireless access points associated with a site and with a plurality of attractions of the site, the portable handheld information terminal comprising:
 a display;
 wireless communication circuitry for wireless communication with a first wireless access point using a first wireless communication mode and with a second wireless access point using a second different wireless communication mode,
 wherein a core application executable by the portable handheld information terminal is downloaded to the portable handheld information terminal via the first wireless access point using the first wireless communication mode and incremental content is downloaded to the portable handheld information terminal via the second wireless access point using the second wireless communication mode, and
 wherein in the first wireless communication mode the core application is downloaded upon a user input supplied to the portable handheld information terminal, and in the second wireless communication mode incremental content is automatically downloaded without any user input being supplied to the portable handheld information terminal.

19. The portable handheld information terminal according to claim 18, wherein the contents of the display automatically change in dependence on the wireless access point with which the portable handheld information terminal communicates.

20. The portable handheld information terminal according to claim 18, wherein the display comprises a touch sensitive display screen and one or more hot spots are displayed on the touch sensitive display screen and touching of the hot spots changes the display on the second display screen.

21. The portable handheld information terminal according to claim 18, wherein the first wireless communication mode is an ad-hoc mode and the second wireless communication mode is an infrastructure mode.

22. The portable handheld information terminal according to claim 18, wherein the first communication mode is a secure mode.

23. The portable handheld information terminal according to claim 18, wherein the incremental content is executable by the portable handheld information terminal.

24. The portable handheld information terminal according to claim 18, wherein the portable handheld information terminal is a mobile telephone.

25. A portable handheld information terminal for use in a local area network (LAN) of a site, the portable handheld information terminal comprising:
wireless communication circuitry configured to wirelessly communicate with a system server of the LAN via a plurality of wireless access points of the LAN; and
a processor configured to execute a core application,
wherein when the portable handheld information terminal is within a wireless communication range of a first wireless access point, the wireless communication circuitry wirelessly connects to and receives from the system server the core application via the first wireless access point using a first wireless communication mode, and the processor executes the core application to provide general content relevant to the site,
wherein when the portable handheld information terminal is within a wireless communication range of a second wireless access point associated with an attraction of the site, the wireless communication circuitry wirelessly connects to and receives from the system server incremental content relevant to the attraction via the second wireless access point using a second wireless communication mode, and the processor uses the incremental content to provide content specific to the attraction, and
wherein the first wireless communication mode is a mode in which the core application is downloaded upon receiving a user input, and the second wireless communication mode is a mode in which the incremental content is automatically downloaded without receiving any user inputs.

26. The portable handheld information terminal according to claim 25, wherein the first wireless communication mode is an ad-hoc mode and the second wireless communication mode is an infrastructure mode.

27. The portable handheld information terminal according to claim 25, wherein the first communication mode is a secure mode.

28. The portable handheld information terminal according to claim 25, wherein the incremental content is executable by the portable handheld information terminal.

29. The portable handheld information terminal according to claim 25, wherein the portable handheld information terminal is a mobile telephone.

30. A method of operating a local area network (LAN) of a site, the LAN comprising a system server and a plurality of wireless access points, the method comprising:
wirelessly downloading a core application from the system server to a portable handheld information terminal via a first wireless access point using a first wireless communication mode when the portable handheld information terminal is within a wireless communication range of the first wireless access point, the core application providing general content relevant to the site when executed by the portable handheld information terminal; and
wirelessly downloading an incremental content relevant to an attraction of the site from the system server to the portable handheld information terminal via a second wireless access point associated with the attraction using a second wireless communication mode when the portable handheld information terminal is within a wireless communication range of the second wireless access point, the incremental content providing content specific to the attraction,
wherein the first wireless communication mode is a mode in which the core application is downloaded upon receiving a user input supplied to the portable handheld information terminal, and the second wireless communication mode is a mode in which the incremental content is automatically downloaded without receiving any user input supplied to the portable handheld information terminal.

31. The method according to claim 30, wherein the first wireless communication mode is an ad-hoc mode and the second wireless communication mode is an infrastructure mode.

32. The method according to claim 30, wherein the first communication mode is a secure mode.

33. The method according to claim 30, wherein the incremental content is executable by the portable handheld information terminal.

34. The method according to claim 30, wherein the portable handheld information terminal is a mobile telephone.

* * * * *